(12) United States Patent  
Arita

(10) Patent No.: US 6,332,061 B1
(45) Date of Patent: Dec. 18, 2001

(54) FOCUS DETECTING DEVICE AND AUTOMATIC FOCUSING CAMERA

(75) Inventor: Hiroshi Arita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,028

(22) Filed: Mar. 13, 2000

(30) Foreign Application Priority Data

Mar. 18, 1999 (JP) .................................................. 11-073418
Mar. 19, 1999 (JP) .................................................. 11-075783

(51) Int. Cl.⁷ .................................................. G03B 13/36
(52) U.S. Cl. .......................... 396/104; 396/128; 396/133
(58) Field of Search ...................................... 396/104, 128, 396/147, 125, 133, 89; 250/201.2, 201.6, 201.8

(56) References Cited

U.S. PATENT DOCUMENTS 4,614,865 * 9/1986 Hayashi ............................ 396/104 X
4,956,660 * 9/1990 Takahashi ............................ 396/104

\* cited by examiner

*Primary Examiner*—W. B. Perkey
(74) *Attorney, Agent, or Firm*—Robin, Blecker & Daley

(57) ABSTRACT

A focus detecting device for performing focus detection of passive type using phase-difference detection includes a sensor composed of a plurality of pixels which are paired, and a judgment circuit for judging whether a target image for focus detection is a thin line close to a pixel pitch of the sensor, on the basis of a correlation varying amount of two images formed divisionally on the sensor and an output difference of adjacent pixels of each of the two images, so that it is possible to cope with the thin-line image.

34 Claims, 19 Drawing Sheets

FOCUS DETECTING DEVICE AND AUTOMATIC FOCUSING CAMERA

BACKGROUND OF THE INVENTION

1. Field of the Invention

The present invention relates to an improvement on a focus detecting device for performing focus detection of the passive type using phase-difference detection and an automatic focusing camera having the focus detecting device.

2. Description of Related Art

In passive-type automatic focusing single-lens reflex cameras, at present, a main trend is to use the so-called phase-difference detecting AF method in which the amount of defocus is detected from the amount of deviation of relative positions of two images on an AF sensor formed by light fluxes having passed through respective different areas of a photographic lens. A general example of such a camera will be explained by using the electrical block diagram shown in FIG. 1.

In FIG. 1, reference numeral 1 denotes a sequence controller for managing the sequence of the camera. Reference numeral 2 denotes a focus detecting device of the phase-difference detection type using a pair of line sensors (being assumed to receive an image "A" and an image "B") for measuring the distance to an object or for detecting a focusing state. Reference numeral 3 denotes an interchangeable photographic lens capable of being driven for focusing according to a result of focus detection obtained by the sequence controller 1 and the focus detecting device 2. Reference numeral 4 denotes a light measuring device for measuring the luminance of an object. Reference numeral 5 denotes a film exposure device for driving a shutter, etc., on the basis of the output of the light measuring device 4. Reference numeral 6 denotes a film transport device for transporting a photographic film. Reference numeral 7 denotes an information display device for displaying information such as a value counted by a film counter. Reference numeral 8 denotes a sound producing device, such as a buzzer, for producing an in-focus confirmation sound or a self-timer sound. Reference numeral 9 denotes a switch (SW1) which is operable for starting the focus detection and the light measurement and is turned on by the first stroke of a release button. Reference numeral 10 denotes a switch (SW2) which is operable for starting the exposure of film and, then, starting the winding of film and is turned on by the second stroke of the release button. Reference numeral 11 denotes a battery for supplying electric power to the camera.

FIG. 18 is a flow chart showing the action of the camera having the construction shown in FIG. 1, including the turning-on of the switch SW1 up to the release operation.

Referring to FIG. 18, first, a check is made to find if the switch SW1 is turned on (S701). If so, an automatic focusing operation is started. That is, an object image, which is a target for focus detection, is accumulated by the focus detecting device 2 (S702), and, then, the accumulated object image is read out (S703). Next, from the amounts of correlation of outputs of two line sensors which are paired, a phase difference on the line sensors is obtained (S704). Here, due to any errors in manufacturing cameras, the phase difference does not necessarily coincide with an ideal value in such a state that focus is adjusted on the surface of film in the camera. Such an amount of deviation of the phase difference is generally obtained at the adjustment step of each camera during manufacturing of cameras, and is stored in a memory of each camera.

After the phase difference on the line sensors is obtained in the above step S704, next, the correction of the deviation of the phase difference (phase-difference correction) is performed (S705). The thus-obtained corrected phase difference is converted into an amount of defocus (defocus amount) on the film surface (S706). Then, a check is made to find if the defocus amount is within an in-focus width (the amount of tolerance according to which an in-focus state can be considered to be obtained) (S707). If the defocus amount is not found to be within the in-focus width (i.e., if an in-focus state is not considered to be obtained), the photographic lens 3 is driven as much as the defocus amount (S708). Then, the flow returns to step S701. If, in the step S701, the switch SW1 remains turned on, the focus detecting operation is performed again (S702 to S706) After that, if the defocus amount is found in the step S707 to be within the in-focus width, a check is made for the states of the switches SW1 and SW2 (S709 and S710). If both the switches SW1 and SW2 are turned on, a release operation, including an exposure operation and a film winding operation, is performed (S711), and the sequence of the camera comes to an end.

In the conventional camera having the abovedescribed construction, in a case where an image formed on the line sensor is a bar chart which has such a thin width that is close to a pixel pitch of the line sensor, as shown in FIG. 19, output waveforms of the line sensors are greatly varied depending on the portions at which the bar charts are formed on the line sensors, so that, in some cases, a result of the correlation computation has errors with respect to the actual phase difference. In the case of FIG. 19, although the image "A" is the same in an optical sense (has the same width) as the image "B", the output waveform of the line sensor on the side of the image "A" has a lower peak than that of the output waveform of the line sensor on the side of the image "B", as shown in the lower part of FIG. 19, because the image "A" extends over two pixels of the line sensor. Accordingly, the result of correlation computation comes to indicate a value different from the actual phase difference. More particularly, if a dead zone part of each pixel of the line sensor is so wide as to be unignorable with respect to the whole pixel, such a difference would increase, resulting in a defocus state on the film surface. In the past, it has been impossible to take any measures over the defocus caused by errors due to such a thin-line chart.

BRIEF SUMMARY OF THE INVENTION

In accordance with an aspect of the invention, there is provided a focus detecting or distance detecting device for detecting a focusing state or a distance by detecting a phase difference of images received by and formed on a sensor having a first light receiving part composed of a plurality of pixels and a second light receiving part composed of a plurality of pixels, the focus detecting or distance detecting device comprising a judgment circuit which judges whether the image received by and formed on the first or second light receiving part is a thin line close to a pixel pitch, so that it is possible to judge the thin line.

In accordance with another aspect of the invention, the judgment circuit judges whether the image received by and formed on the first or second light receiving part is the thin line, on the basis of an output difference of adjacent pixels among the plurality of pixels, or on the basis of a degree of coincidence of images formed on the first and second light receiving parts, or on the basis of an output difference of adjacent pixels among the plurality of pixels and a degree of coincidence of images formed on the first and second light receiving parts.

In accordance with a further aspect of the invention, there is provided a focus adjusting apparatus having a focus detecting or distance detecting device for detecting a focusing state or a distance by detecting a phase difference of images received by and formed on a sensor having a first light receiving part composed of a plurality of pixels and a second light receiving part composed of a plurality of pixels, the focus adjusting apparatus comprising a judgment circuit which judges whether the image received by and formed on the first or second light receiving part is a thin line close to a pixel pitch, and a control circuit which causes a processing operation of the focus adjusting apparatus to be performed in a first processing mode when the image received by and formed on the first or second light receiving part is judged by the judgment circuit to be the thin line, and causes the processing operation of the focus adjusting apparatus to be performed in a second processing mode when the image received by and formed on the first or second light receiving part is judged by the judgment circuit not to be the thin line, so that the thin-line image can be appropriately processed.

The above and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

(First Embodiment)

Figure 1:
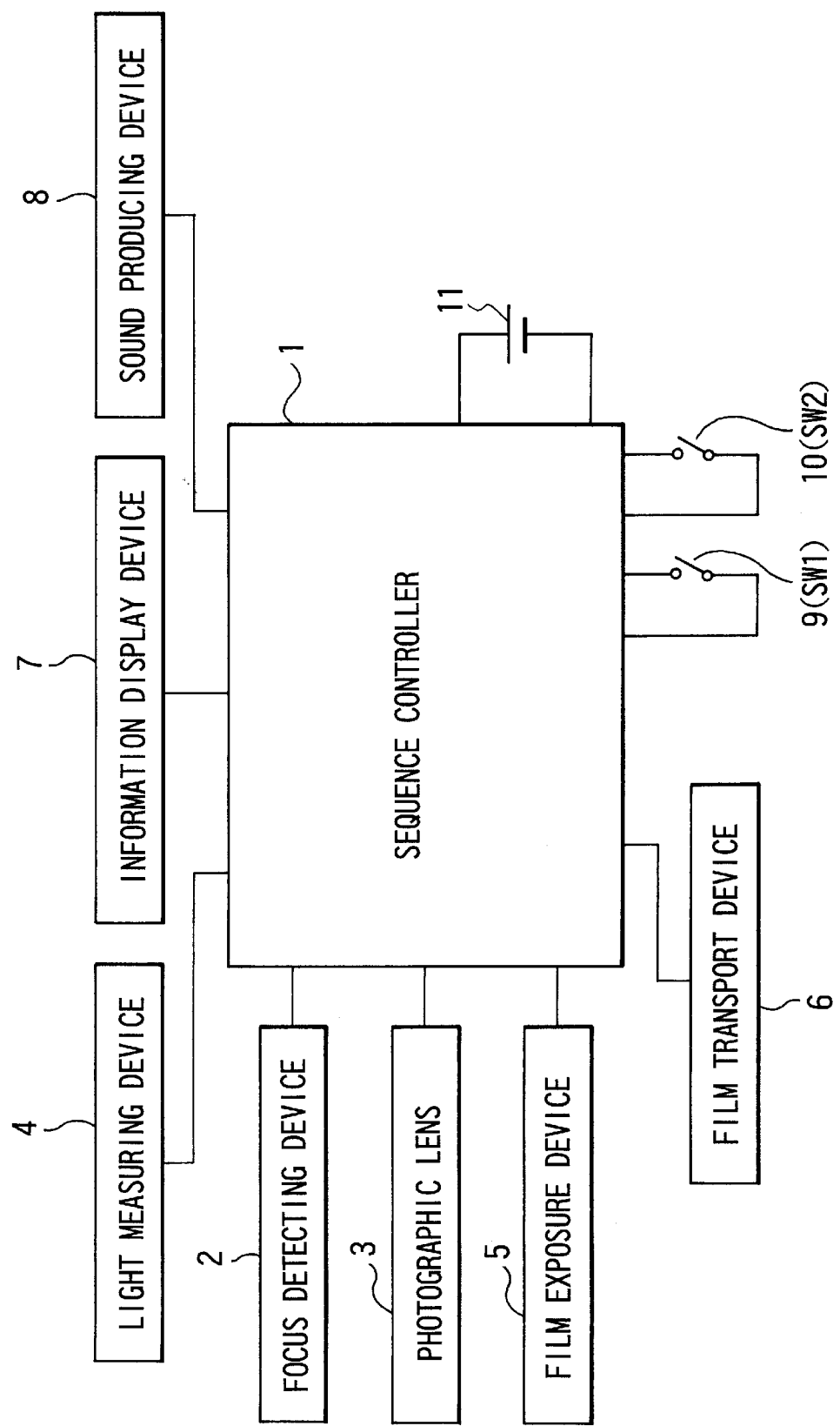
FIG. 1 is a block diagram showing the electrical outline arrangement of a conventional camera or a camera according to each of first to third embodiment of the invention.
Figure 2:
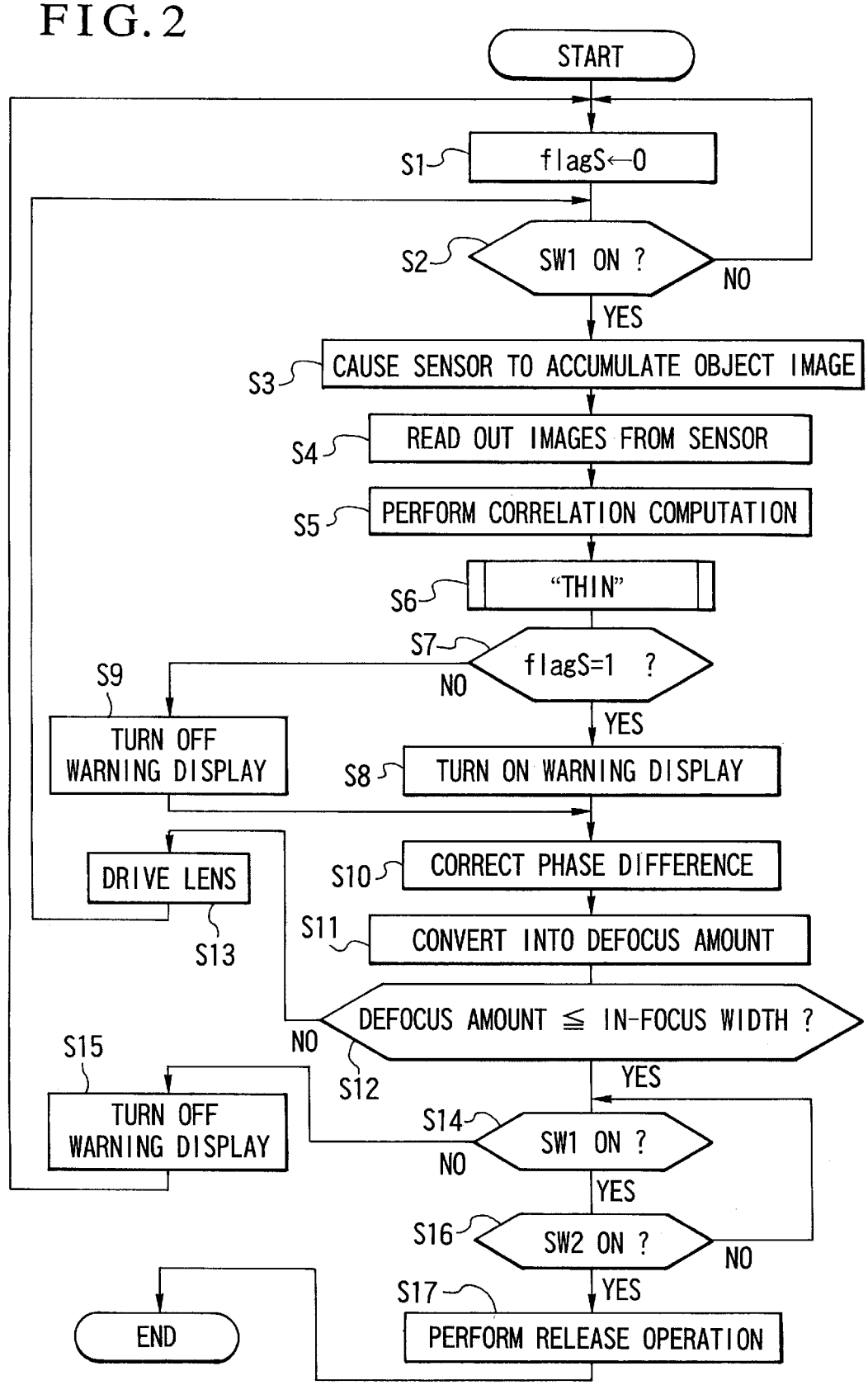
FIG. 2 is a flow chart showing a series of operations of the camera according to the first embodiment of the invention.

FIG. 2 is a flow chart showing a series of operations of a camera according to a first embodiment of the invention. The circuit construction of the camera is the same as that shown in FIG. 1, which is, therefore, also used for the first embodiment of the invention.

Referring to FIG. 2, first, a flag flags, which is set at "1" if an object image is a thin line, is initialized (reset) (S1). Next, a check is made to find if the switch SW1 is turned on (S2). If the switch SW1 is found to be turned off, the flow returns to an initial state. If the switch SW1 is found to be turned on, an automatic focusing operation (S3 and subsequent steps) is started.

First, an object image, which is a target for focus detection, is accumulated by the focus detecting device 2 (S3). Then, the accumulated object image is read out (S4). Next, a correlation computation on data of two images which are paired is performed. Concretely, while the two images are relatively shifted in units of pixel, such a shift value as to make the correlation of the two images highest is obtained (S2). Subsequently, a subroutine "THIN" for judging whether an object image is a thin line is called (S6). In the subroutine "THIN", the flag flagS is set to "1" if the object image is a thin line, and the flag flagS is set to "0" if the object image is not a thin line (the details thereof will be described later). After the subroutine "THIN" is ended, a check is made for the flag flags (S7). If the flag flags is set to "1", a warning display for informing the photographer that the object image is a thin line is turned on (S8). If the flag flagS is set to "0", the warning display is turned off (S9). Such a warning display is performed by the information display device 7, which may be the blinking of an LED or may be the blinking of a particular pattern of an LCD panel.

After that, in the same manner as in the conventional camera, a phase-difference correction is performed (S10). The thus-obtained corrected phase difference is converted into an amount of defocus (defocus amount) on the film surface (S11). Then, a check is made to find if the defocus amount is within an in-focus width (the amount of tolerance according to which an in-focus state can be considered to be obtained) (S12). If the defocus amount is not found to be within the in-focus width (i.e., if an in-focus state is not considered to be obtained), the photographic lens 3 is driven as much as the defocus amount (S13). Then, the flow returns to step S2.

On the other hand, if the defocus amount is found in the step S12 to be within the in-focus width, a check is made for the states of the switches SW1 and SW2 (S14 and S16). If both the switches SW1 and SW2 are turned on, a release operation, including an exposure operation and a film winding operation, is performed by driving the film exposure device 5 and the film transport device 6 (S17), and the sequence of the camera comes to an end.

Further, if the switch SW1 is found in the step S14 to be turned off, the warning display is turned off (S15), and the flow returns to the initial state.

Next, the thin-line judging subroutine "THIN" will be described with reference to the flow charts of FIGS. 3 and 4.

Figure 3:
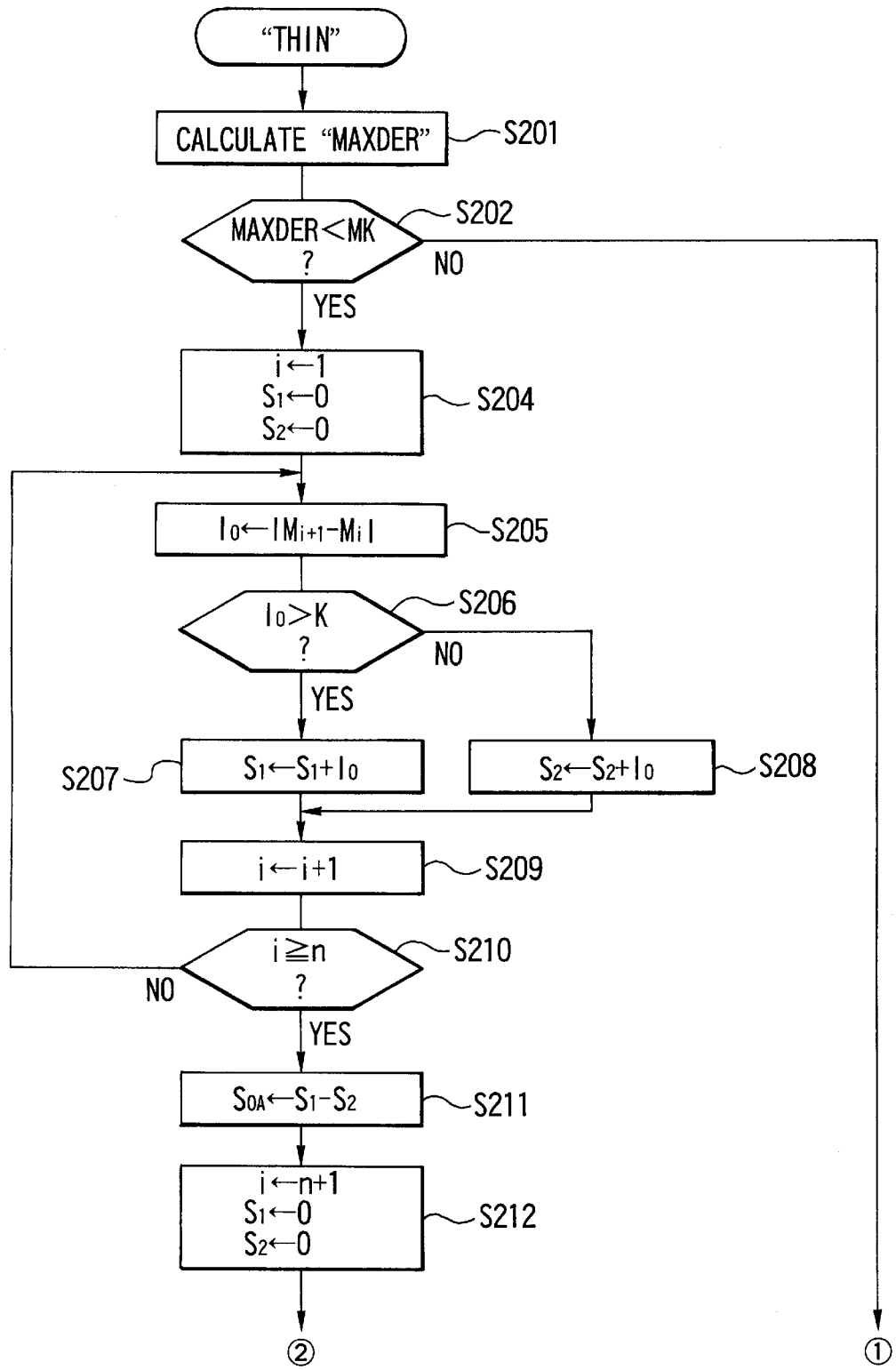
FIG. 3 is a flow chart showing a part of an operation for judging a thin line in the first embodiment of the invention.
Figure 4:
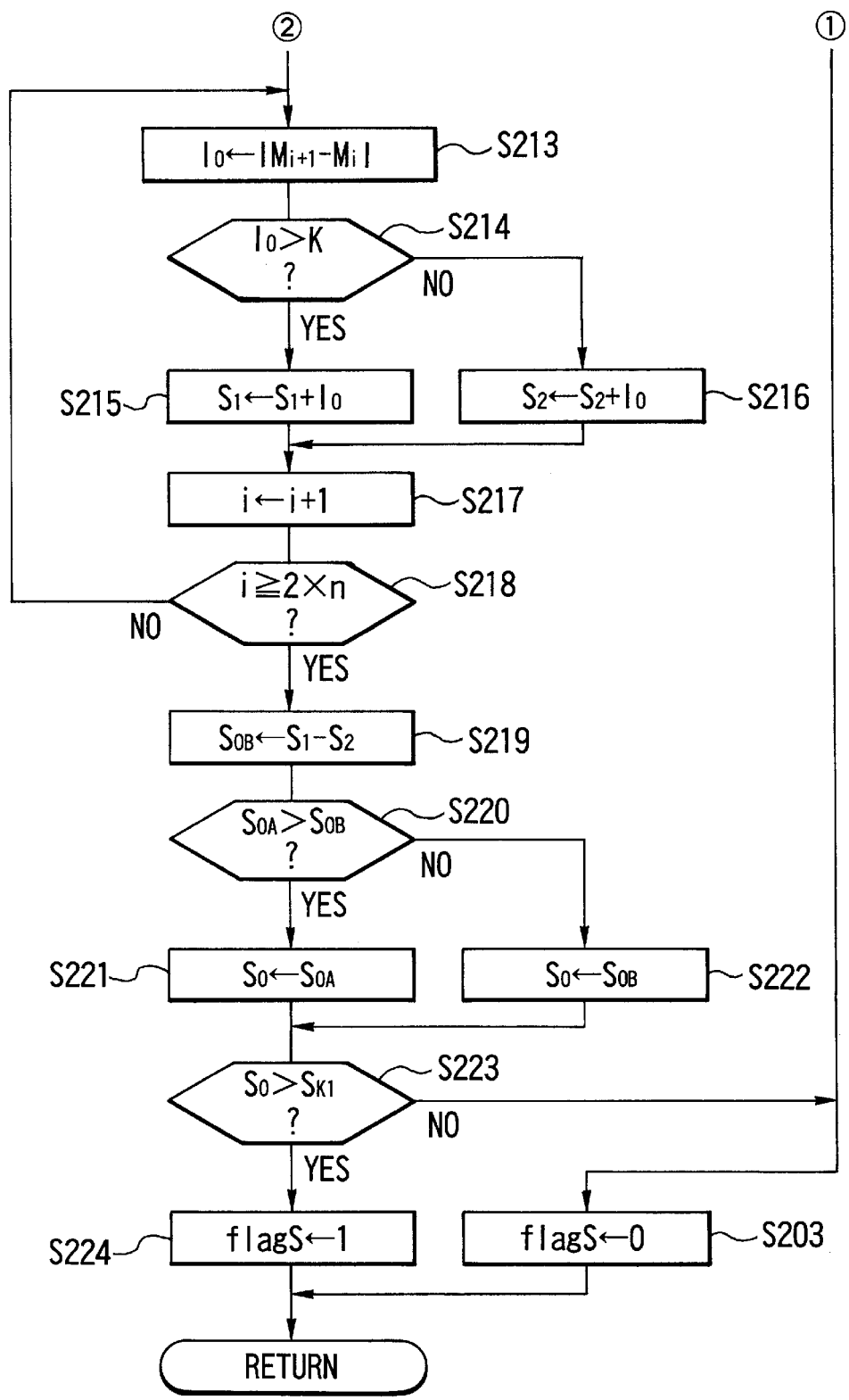
FIG. 4 is a flow chart showing the operation continuing from the operation shown in FIG. 3.

Referring to FIG. 3, first, a maximum correlation varying amount difference MAXDER of two images on the line sensors is obtained (S201). Here, the "maximum correlation varying amount difference" means a maximum value of inclination of a correlation varying amount obtained when the two images are relatively shifted in units of pixel. The larger the value of maximum correlation varying amount difference, the higher a "degree of coincidence" of the two images becomes. The thus-obtained maximum correlation varying amount difference MAXDER is compared with a threshold value MK (S202). If the value MAXDER is not less than the threshold value MK (i.e., if the degree of coincidence of two images is high), it is judged that the object image is not a thin line. Then, the flow proceeds to step S203 shown in FIG. 4, where the flag flags is set to "0", and the thin-line judging subroutine "THIN" is brought to an end.

On the other hand, if it is found in step S202 that the value MAXDER is less than the threshold value MK, a check based on an adjacent difference value of image data is made (S204 to S223).

Concretely, first, a pixel counter i is set to "1", and addition work variables $S_1$ and $S_2$ are initialized to "0" (S204). Next, an absolute value |Mi+1−Mi| of the difference between outputs of adjacent pixels in a case where Mi is image data of the i-th pixel is substituted into a variable $I^O$ (S205). Then, a check is made to find if the variable $I_O$ is larger than a threshold value K (S206). If so, the variable $I_O$ is added to the addition work variable $S_1$ (S207). If not, the variable $I_O$ is added to the addition work variable S2 (S208). After that, the pixel counter i is incremented (S209), and the value of the pixel counter i is compared with the number of pixels n of one line of the line sensors (S210). If the value of the pixel counter i is less than the number of pixels n, the flow returns to step S205.

According to a loop of the steps S205 to S210, as a result, the processing operation in the steps S205 to 208 is repeated from "i=1" until "i=n−1" (i.e., as much as all pixels for one line sensor).

After the end of the above-mentioned loop, a value "$S_1$−$S_2$" is stored into a variable $S_{OA}$ (S211). Next, the processing for another line sensor is performed in the similar manner. First, the pixel counter i is set to "n+1", and the addition work variables $S_1$ and $S_2$ are initialized to "0" (S212). Subsequently, an absolute value |Mi+1−Mi| of the difference between outputs of adjacent pixels is obtained in the similar manner and is then substituted into the variable $I_O$ (S213). Then, a check is made to find if the variable $I_O$ is larger than the threshold value K (S214). If so, the variable $I_O$ is added to the addition work variable $S_1$ (S215). If not, the variable Io is added to the addition work variable $S_2$ (S216). After that, the pixel counter i is incremented (S217), and the value of the pixel counter i is compared with the number of pixels "2×n" (S218). If the value of the pixel counter i is less than the number of pixels "2×n", the flow returns to step S213, so that the processing in the steps S213 to S216 is repeated from "i=n+1" until "i=(2×n)−1" (i.e., as much as all pixels for the other line sensor).

After the end of the above-mentioned loop, a value "$S_1$−$S_2$" is stored into a variable $S_{OB}$ as data for the other line sensor (S219). Then, the larger one of the thus-obtained variables $S_{OA}$ and $S_{OB}$ is substituted into a variable $S_O$, and the variable $S_O$ is compared with a threshold value $S_{K1}$ (S220 to S223). Here, the value of each of the variables $S_{OA}$ and $S_{OB}$ becomes large in a case where the object image has a steep inclination portion and is flat in portions other than the steep inclination portion. In other words, the value of each of the variables $S_{OA}$ and $S_{OB}$ becomes large in the case of an object image having many sharp edges, i.e, in the case of a bar chart. Among the bar chart, a wide chart makes the degree of incidence of two images high, so that, in step S202, the maximum correlation varying amount difference MAXDER is apt to become larger than the threshold value MK.

Therefore, by setting the threshold value MK to such an appropriate value as to make the flow branch to step S203 from step S202 in the case of a bar chart other than a thin line, the case where, in step S223, the variable $S_O$ is found to be larger than the threshold value $S_{K1}$ is limited to a case where the object image is a thin-line chart. Accordingly, in the case of "$S_O$>$S_{K1}$" in step S223, it is possible to judge that the object image is a thin line, so that the thin-line flag flagS is set to "1" (S224). In the case other than "$S_O$>$S_{K1}$", the thin-line flag flags is cleared to "0" (S203). Then, this subroutine is brought to an end.

According to the above-described algorithm, it is possible to surely judge whether an object image, which is a target for focus detection, is a thin line, on the basis of only image data of line sensors. Therefore, it is possible to take such measures over the thin line as to beforehand give warning to the photographer. As a result, it is possible for the photographer to beforehand avoid a defocus state by re-adjusting focus onto another object which causes a less focus detection error.

(Second Embodiment)

In the first embodiment, the absolute value |Mi+1−Mi| of the difference between outputs of adjacent pixels is added, as it is, to the addition work variable $S_1$ or $S_2$ before checking as to whether the absolute value |Mi+1−Mi| is larger than the threshold value K (step S206 in FIG. 3). However, if the absolute value |Mi+1−Mi| is squared and is then added to the addition work variable $S_1$ or $S_2$, such an adding operation as to emphasize an edge portion relative to image data is realized, so that it is expected that the accuracy for judging a thin line is improved. This arrangement will be described below as a second embodiment of the invention.

Figure 5:
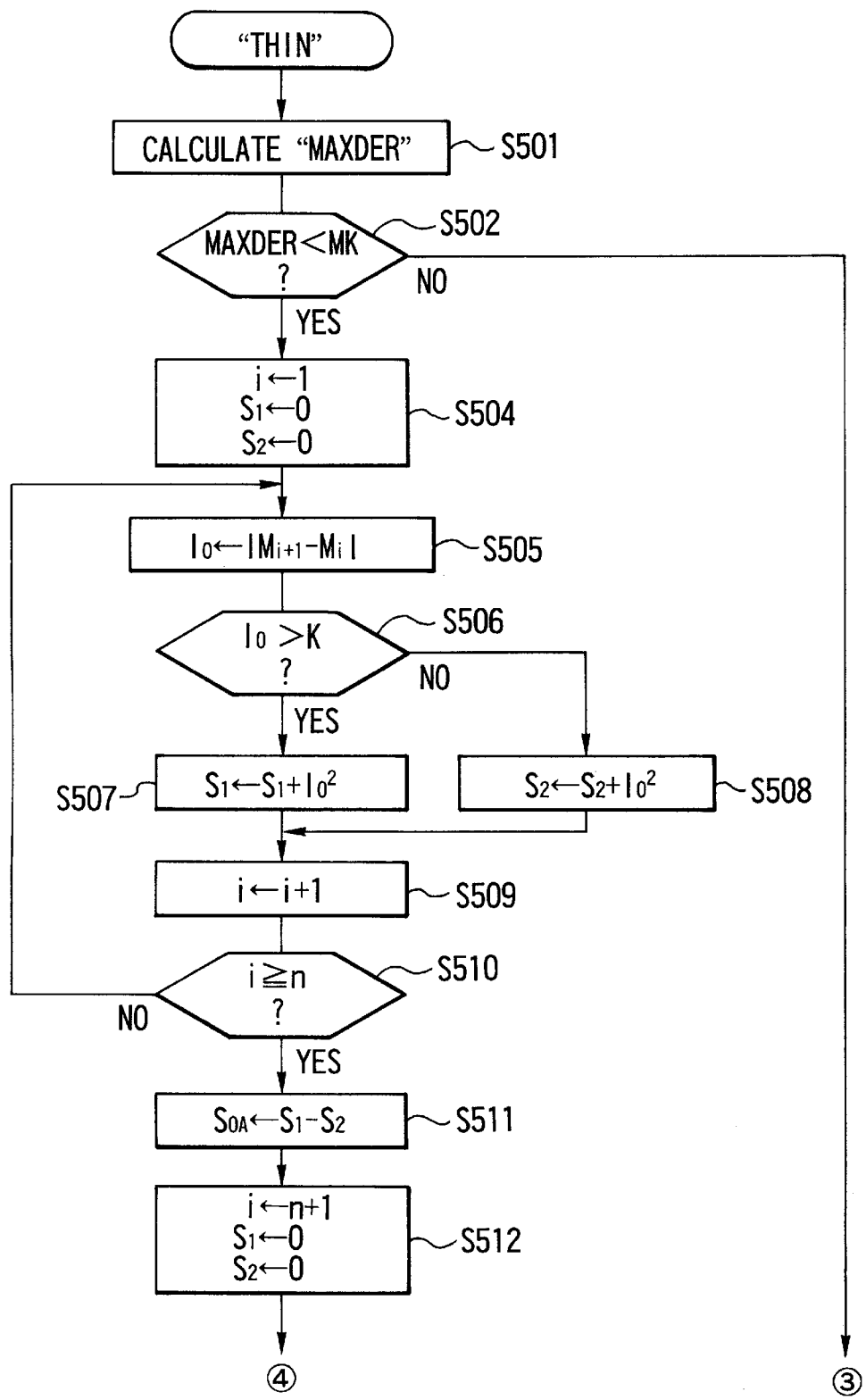
FIG. 5 is a flow chart showing a part of an operation for judging a thin line in the second embodiment of the invention.
Figure 6:
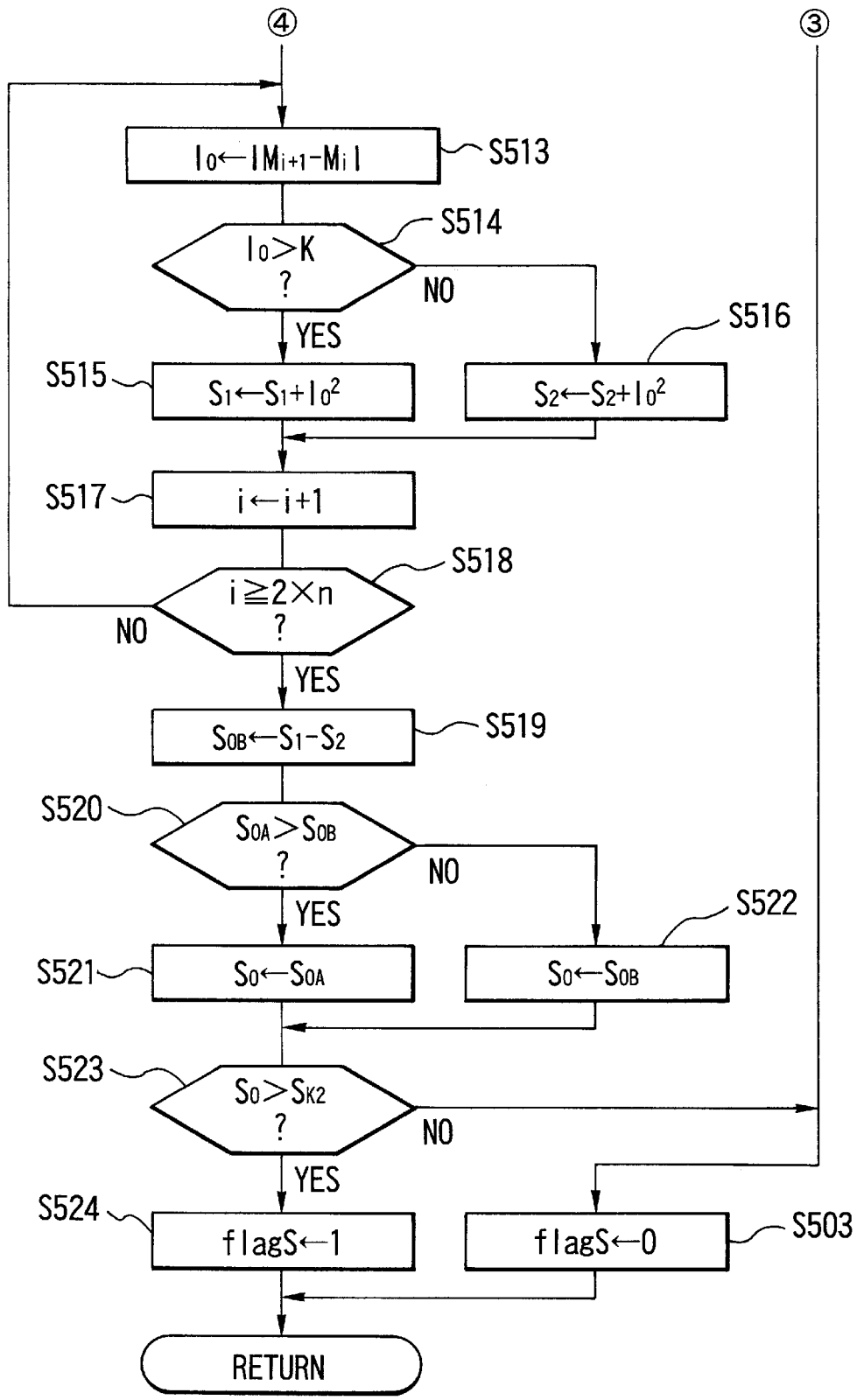
FIG. 6 is a flow chart showing the operation continuing from the operation shown in FIG. 5.

FIGS. 5 and 6 are flow charts showing a thin-line judging subroutine "THIN" for a camera according to the second embodiment of the invention. The electrical structure and other actions of the camera in the second embodiment are similar to those in the above-described first embodiment, and are, therefore, omitted from the description.

Referring to FIG. 5, first, as in the first embodiment, a maximum correlation varying amount difference MAXDER of two images on the line sensors is obtained (S501). Next, the maximum correlation varying amount difference MAXDER is compared with a threshold value MK (S502). If the maximum correlation varying amount difference MAXDER is not less than the threshold value MK, it is judged that the object image is not a thin line, and the flow proceeds to step S503 shown in FIG. 6. Then, this subroutine is brought to an end.

On the other hand, if it is found in step S502 that the value MAXDER is less than the threshold value MK, a check based on an adjacent difference value of image data is made (S504 to S523).

Concretely, first, a pixel counter i is set to "1", and addition work variables $S_1$ and $S_2$ are initialized to "0" (S504). Next, an absolute value |Mi+1−Mi| of the difference between outputs of adjacent pixels in a case where Mi is image data of the i-th pixel is substituted into a variable $I_O$ (S505). Then, a check is made to find if the variable $I_O$ is larger than a threshold value K (S506). If so, the variable $I_O$ is squared and is then added to the addition work variable $S_1$ (S507). If not, the variable $I_O$ is also squared and is then added to the addition work variable S2 (S508). After that, in the similar manner to the first embodiment, the processing operation in the steps S505 to 508 is repeated from "i=1" until "i=n−1" (i.e., as much as all pixels for one line sensor).

After the end of the above-mentioned loop, a value "$S_1$–$S_2$" is stored into a variable $S_{OA}$ (S511). Next, the processing for another line sensor is performed in the similar manner. First, the pixel counter i is set to "n+1", and the addition work variables $S_1$ and $S_2$ are initialized to "0" (S512). Subsequently, an absolute value |Mi+1−Mi| of the difference between outputs of adjacent pixels is obtained in the similar manner and is then substituted into the variable $I_O$ (S513). Then, a check is made to find if the variable $I_O$ is larger than the threshold value K (S514). If so, the variable $I_O$ is squared and is then added to the addition work variable $S_1$ (S515). If not, the variable $I_O$ is also squared and is then added to the addition work variable $S_2$ (S516). After that, the pixel counter i is incremented (S517), and the value of the pixel counter i is compared with the number of pixels "2×n" (S518). Then, the processing in the steps S513 to S516 is repeated from "i=n+1" until "i=(2×n)−1" (i.e., as much as all pixels for the other line sensor).

After the end of the above-mentioned loop, a value "$S_1$–$S_2$" is stored into a variable $S_{OB}$ as data for the other line sensor (S519). Then, the larger one of the thus-obtained variables $S_{OA}$ and $S_{OB}$ is substituted into a variable $S_O$, and the variable $S_O$ is compared with a threshold value $S_{K2}$ (S520 to S523). In the case of "$S_O>S_{K2}$" in step S523, it is judged that the object image is a thin line, so that the thin-line flag flags is set to "1" (S524). In the case other than "$S_O>S_{K2}$", the thin-line flag flagS is cleared to "0" (S503). Then, this subroutine is brought to an end.

(Third Embodiment)

In the above-described first and second embodiments, the judging condition in the thin-line judging subroutine "THIN" is a sole level. Therefore, if the object image has a level just very close to the judging level, the thin-line flag flagS becomes "1" and "2" alternately every time the subroutine "THIN" is called, because of the sensor noise or the motion of the object. As a result, the thin-line warning is sometimes given and sometimes not given during the turning-on of the switch SW1, so that the photographer is sometimes given an unpleasant feeling.

To improve such an inconvenience, a third embodiment of the invention is developed to apply hysteresis to the thin-line judging condition according to the preceding content of the thin-line flag flags. The third embodiment of the invention will be described with reference to the flow charts of FIGS. 7 and 8. The electrical structure and other actions of the camera in the third embodiment are similar to those in the first embodiment, and are, therefore, omitted from the description.

Figure 7:
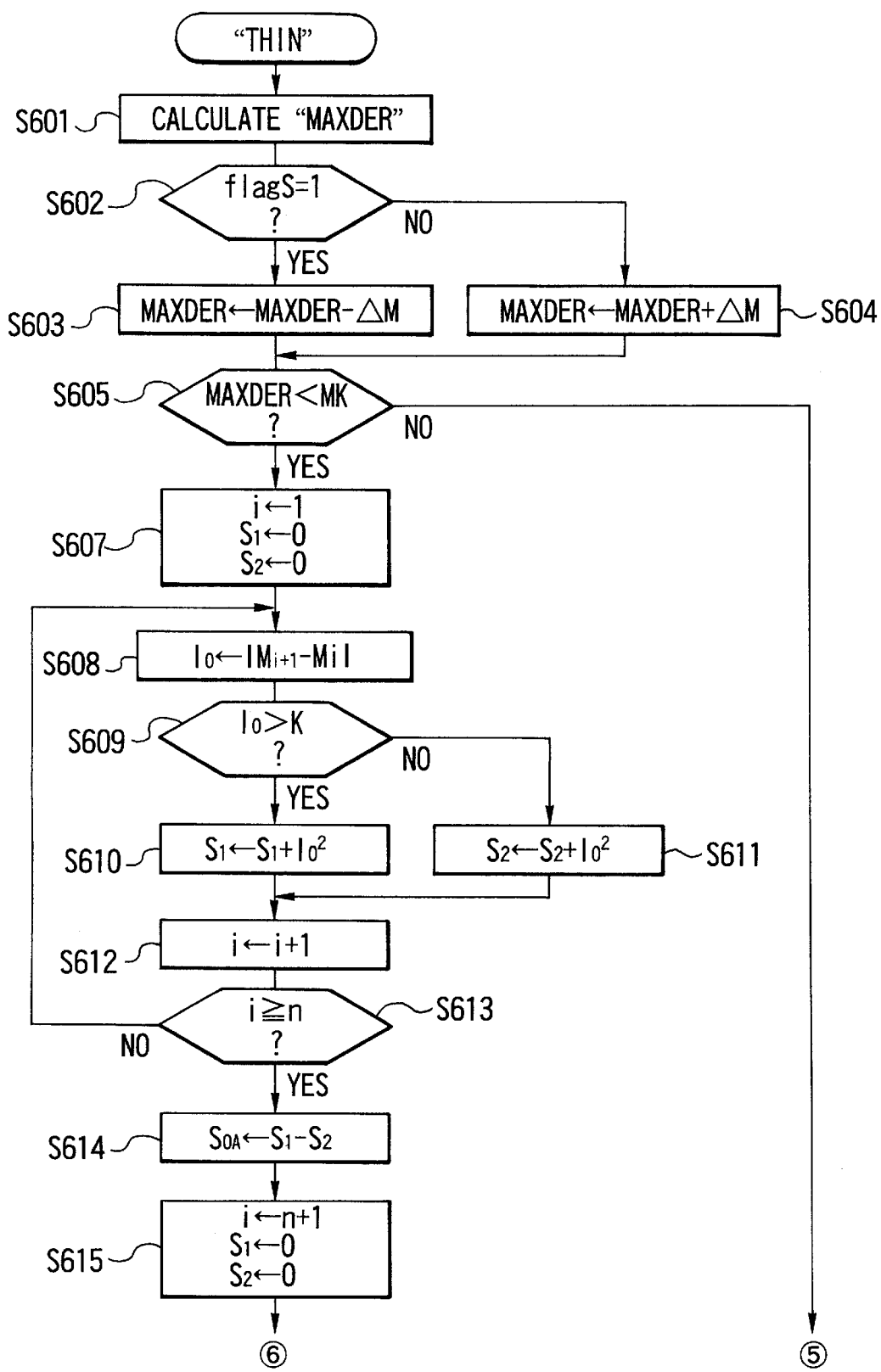
FIG. 7 is a flow chart showing a part of an operation for judging a thin line in the third embodiment of the invention.
Figure 8:
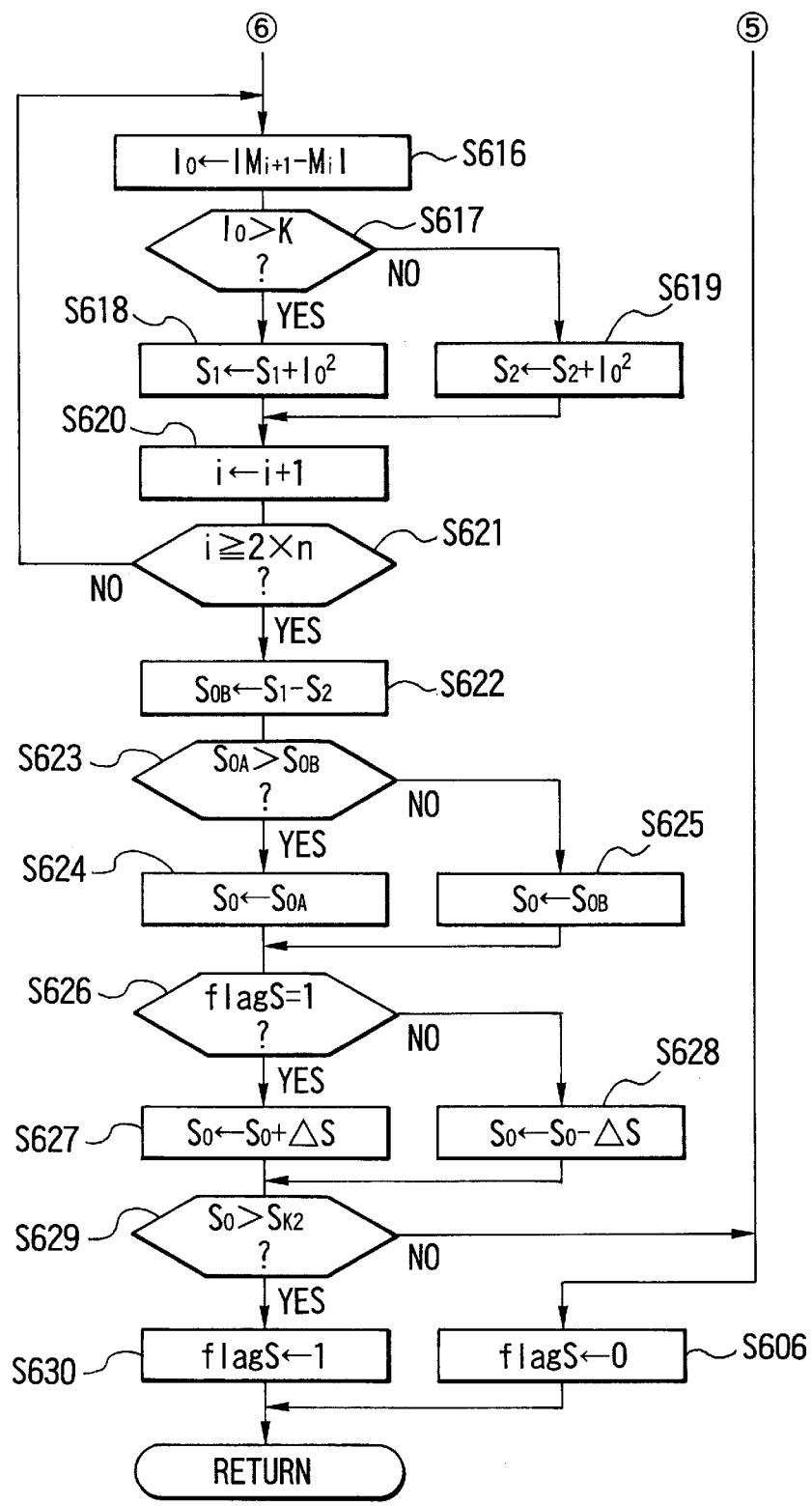
FIG. 8 is a flow chart showing the operation continuing from the operation shown in FIG. 7.

Referring to FIG. 7, first, as in the first embodiment, a maximum correlation varying amount difference MAXDER of two images on the line sensors is obtained (S601). Then, a check is made for the thin-line flag flags as the preceding thin-line judging result (S602). If the thin-line flag flagS is "1", a value ΔM for hysteresis is subtracted from the value MAXDER (S603). If the thin-line flag flagS is "0", the value ΔM for hysteresis is added to the value MAXDER (S604). Subsequently, the value MAXDER, which the value ΔM for hysteresis has been subtracted from or added to, is compared with a threshold value MK (S605). If the value MAXDER is not less than the threshold value MK, it is judged that the object image is not a thin line, and the flow proceeds to step S606 shown in FIG. 8. In step S606, the thin-line flag flags is set to "0". Then, this subroutine is brought to an end.

As a result of this, in a case where the object image has been judged to be a thin line in the preceding thin-line judging subroutine, the object image becomes apt to be judged to be a thin line in step S605. Conversely, in a case where the object image has not been judged to be a thin line in the preceding thin-line judging subroutine, the object image becomes hard to be judged to be a thin line this time.

After that (S607 and subsequent steps), as in the second embodiment, a check based on an adjacent difference value of image data is made. Here, with regard to the obtained value $S_O$, hysteresis is also applied to the preceding thin-line judging result, according to the preceding thin-line judging result, by adding the value ΔM to the value $S_O$ if the thin-line flag flagS is "1" or by subtracting the value ΔM from the value $S_O$ if the thin-line flag flags is "0". After that, the value $S_O$ is compared with a threshold value $S_{K2}$ (S629). In the case of "$S_O>S_{K2}$" in step S629, it is judged that the object image is a thin line, so that the thin-line flag flagS is set to "1" (S630). In the case other than "$S_O>S_{K2}$", the thin-line flag flagS is cleared to "0" (S606). Then, this subroutine is brought to an end.

In the conventional camera, in a case where the object image, which is a target for focus detection, is a thin-line chart having such a thin width that is close to a pixel pitch of the focus detecting line sensor, output waveforms of the line sensors are greatly varied depending on the portions at which the thin-line charts are formed on the line sensors, so that, in some cases, a result of the correlation computation has errors with respect to the actual phase difference. However, according to each of the above-described embodiments, an algorithm is so arranged as to enable the camera to recognize whether the object image, which is a target for focus detection, is a thin-line chart (whether the object image is an image suited for the correlation computation, i.e., whether the object image is appropriate as image data to be used for focus adjustment), on the basis of the correlation varying amount of two images formed divisionally on the line sensors and the difference of outputs of adjacent pixels of each of the two images. Accordingly, in the case of the thin-line chart, for example, it is possible to give warning to the photographer. By this warning, it is possible for the photographer to beforehand avoid a defocus state by re-adjusting focus onto another object which causes a less focus detection error.

In each of the of the above-described embodiments, the invention is applied to a camera by way of example. The invention can be applied, without limiting to the camera, to other optical apparatuses having a focus detecting device of the phase-difference detection type.

Further, in each of the of the above-described embodiments, if the object image is a thin line, a warning display is provided for informing the photographer of the thin-line image. The invention is not limited to this arrangement. For example, there may be made such an arrangement that a release operation is not permitted until a focusing operation is performed onto an object which is not a thin-line object.

Further, there may be made such an arrangement that, in the flow chart shown in FIG. 2, when the object image is judged to be a thin line, the flow proceeds to step S2.

(Fourth Embodiment)

Figure 9:
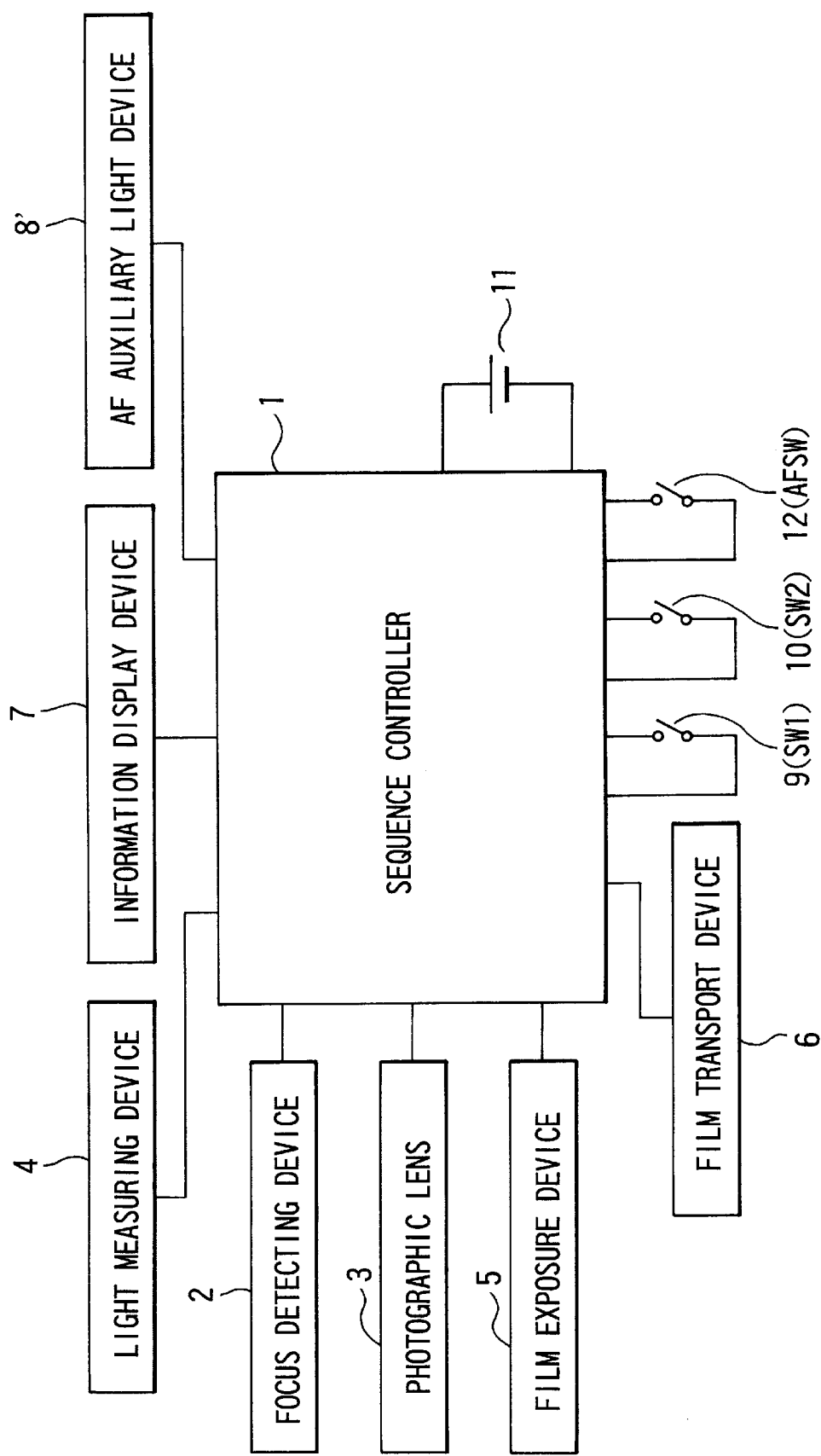
FIG. 9 is a block diagram showing the electrical outline arrangement of a camera according to each of fourth to sixth embodiments of the invention.
Figure 10:
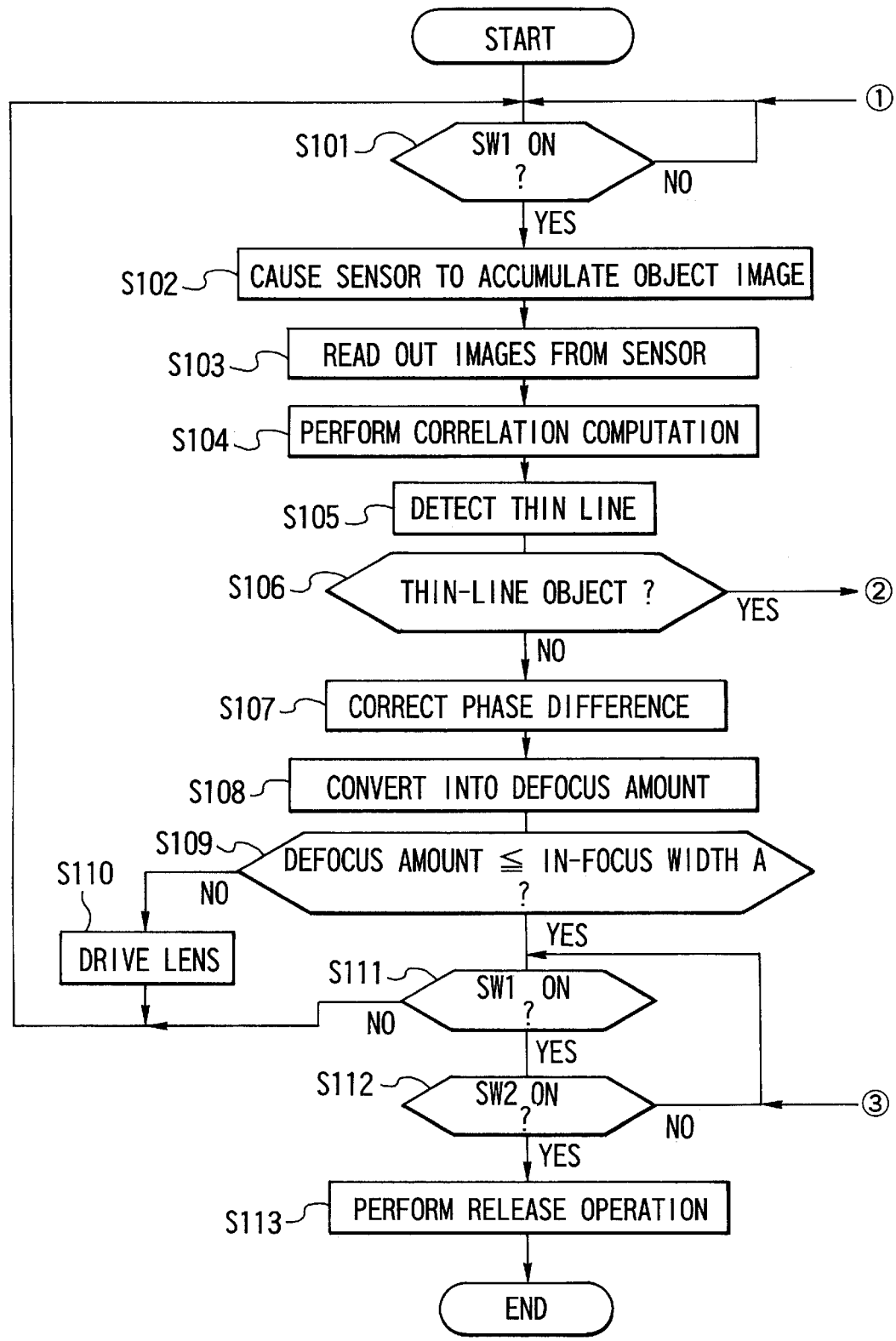
FIG. 10 is a flow chart showing a part of a series of operations in the fourth embodiment of the invention.
Figure 11:
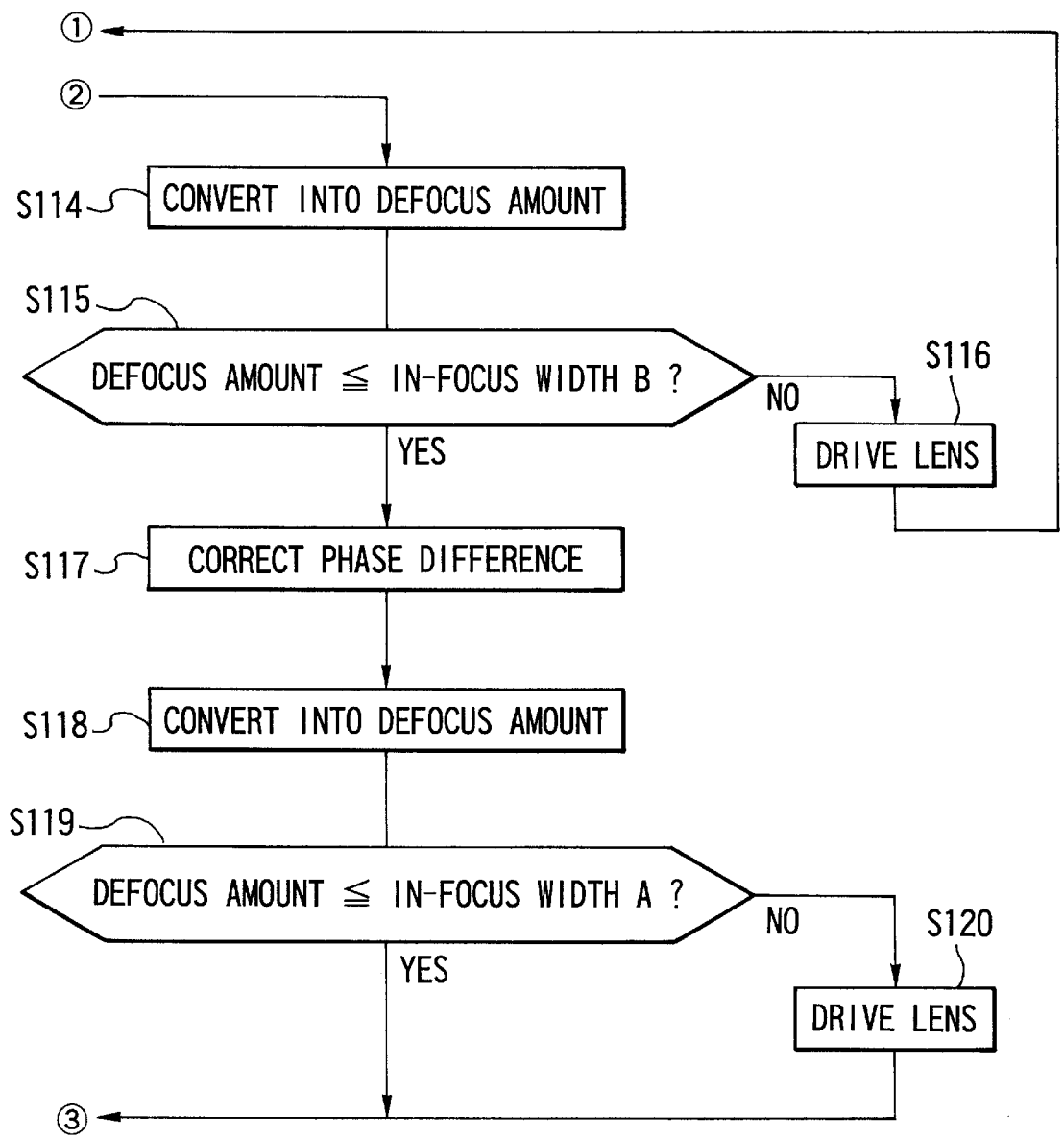
FIG. 11 is a flow chart showing the operation continuing from the operation shown in FIG. 10.

FIGS. 10 and 11 are flow charts showing a series of actions of a camera according to a fourth embodiment of the invention. The electrical structure of the camera is shown in the block diagram of FIG. 9. In FIG. 9, the parts similar to those shown in FIG. 1 are denoted by the same reference numerals as in FIG. 1. Further, in FIG. 9, reference numeral 8' denotes an AF auxiliary light device, and reference numeral 12 denotes a switch for selecting an automatic focusing mode from between a one-shot mode and a servo mode.

Referring to FIG. 10, first, a check is made to find if the switch SW1 is turned on (S101). If the switch SW1 is found to be turned off, the flow returns to an initial state. If the switch SW1 is found to be turned on, an automatic focusing operation beginning with step S102 is started.

Concretely, an object image, which is a target for focus detection, is accumulated by the focus detecting device 2 (S102). Then, the accumulated object image is read out (S103). Next, a correlation computation on data of two images which are paired is performed. Concretely, while the two images are relatively shifted in units of pixel, such a shift value as to make the correlation of the two images highest is obtained (S104). Subsequently, it is detected (judged) whether the object image is a thin line (S105). Although several methods of judging whether the object image is a thin line can be contrived, the method described in any one of the first to third embodiments described above is used here. Thus, the method of judgment based on the correlation varying amount of two images obtained by paired line sensors and the difference of outputs of adjacent pixels of each line sensor is most accurate and ideal.

Next, a check is made to find if the object image has been judged to be a thin line (S106). If not, the same processing as in the conventional camera is performed. More specifically, a phase-difference correction is performed (S107). The thus-obtained corrected phase difference is converted into an amount of defocus (defocus amount) on the film surface (S108). Then, a check is made to find if the defocus amount is within an in-focus width A (the amount of tolerance according to which an in-focus state can be considered to be obtained) (S109). If the defocus amount is not found to be within the in-focus width A (i.e., if an in-focus state is not considered to be obtained), the photographic lens 3 is driven as much as the defocus amount A (S110). Then, the flow returns to the initial state.

On the other hand, if the defocus amount is found in the step S109 to be within the in-focus width A, a check is made for the states of the switches SW1 and SW2 (S111 and S112). If both the switches SW1 and SW2 are turned on, a release operation, including an exposure operation and a film winding operation, is performed by driving the film exposure device 5 and the film transport device 6 (S113), and the sequence of the camera comes to an end.

Figure 12:
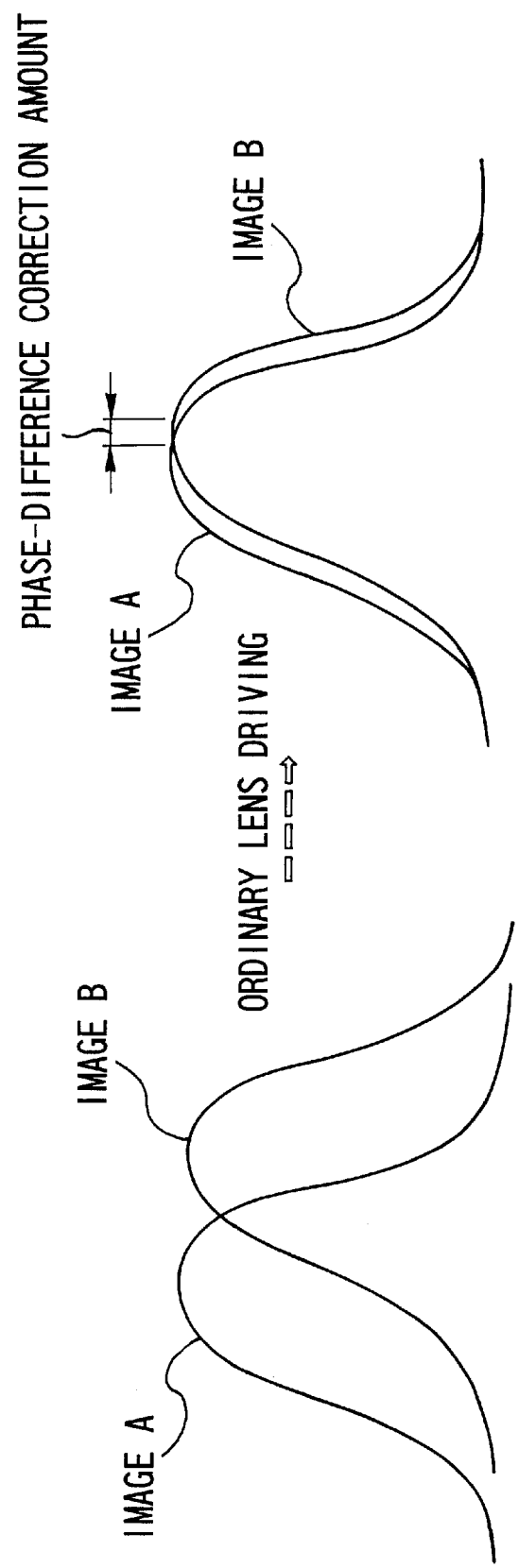
FIGS. 12(a) and 12(b) are diagrams for explaining a method of driving a lens in a case where the object image is not a thin line, in each of the fourth to sixth embodiments of the invention.

The manner of driving the photographic lens 3 in a case where the object image is not a thin line can be illustrated as the state shown in FIG. 12(*a*) shifts to the state shown in FIG. 12(*b*).

On the other hand, if the object image has been judged in the above step S106 to be a thin line, the so-called thin-line processing is performed differently from the above-mentioned ordinary processing. This thin-line processing will be described below with reference to FIG. 11 and FIGS. 13(*a*) to 13(*c*).

Figure 13:
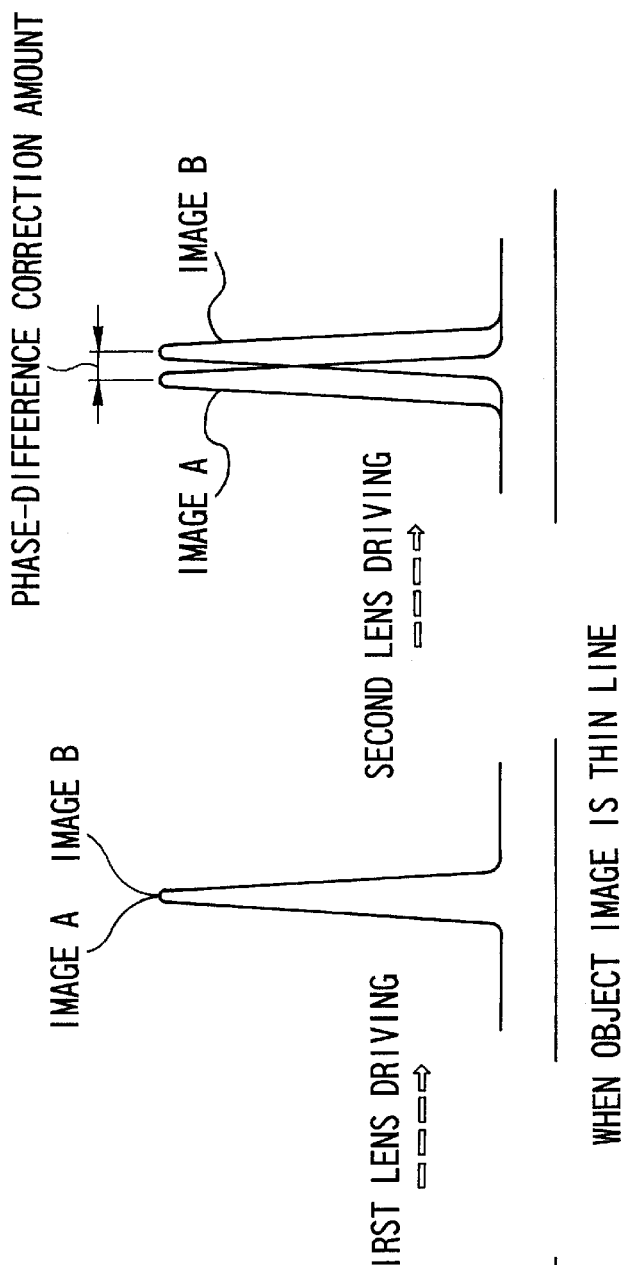
FIGS. 13(a) and 13(b) are diagrams for explaining a method of driving the lens in a case where the object image is a thin line, in each of the fourth to sixth embodiments of the invention.

First, in order to perform "first lens driving" (see FIG. 13(*a*) to FIG. 13(*b*)) whose target position is such a position as to make zero or nearly zero a phase difference obtained without performing the phase-difference correcting processing (i.e., a position where two images completely coincide with each other), the value obtained without performing the phase-difference correcting processing is converted into a defocus amount (S114). Then, a check is made to find if the defocus amount is within an in-focus width B (the amount of tolerance according to which the two images can be considered to perfectly coincide with each other) for thin-line judgment (S115). If the defocus amount is not found to be within the in-focus width B (i.e., if the two images are not considered to perfectly coincide with each other), the photographic lens 3 is driven as much as the defocus amount B (S116). Then, the flow returns to the initial state. Subsequently, the processing in the steps S101 to S116 is repeated until the two images coincide with each other.

Here, since, in a case where the object image is a thin line, some errors may occur depending on the portion at which the thin-line bar is formed on the line sensor, it is not always possible to bring the photographic lens 3 to such a position as to make the two images coincide with each other by driving once the photographic lens 3 in step S116. Therefore, the driving of the photographic lens 3 has to be repeated some times. Then, every time the photographic lens 3 is driven once, the photographic lens 3 is, at least, made to advance in such a direction as to make the two images coincide with each other, so that the above-mentioned errors come to progressively decrease. As a result, the photographic lens 3 can reach the correct target position (the position where the two images perfectly coincide with each other).

After that, if the defocus amount is found in the step S115 to be not greater than the in-focus width B, "second lens driving" (see FIG. 13(*b*) to FIG. 13(*c*)) is performed. That is, a phase-difference correction is performed on the phase difference obtained in the step S104 (S117). The thus-obtained corrected phase difference is converted into a defocus amount (S118). Then, a check is made to find if the defocus amount obtained in the step S118 is within the in-focus width A (S119). If the defocus amount is already within the in-focus width A, it is considered that the AF processing operation has ended, and the flow jumps to step S111 in FIG. 10, where a check is made for the states of the switches SW1 and SW2 (S111 and S112). If both the switches SW1 and SW2 are turned on, a release operation, including an exposure operation and a film winding operation, is performed (S113), and the sequence of the camera comes to an end. on the other hand, if the defocus amount is found in the step S119 to be not within the in-focus width A, the photographic lens 3 is driven as much as the defocus amount (S120), and the flow also jumps to step sill in FIG. 10 to perform the same processing as that described above. Then, the sequence of the camera comes to an end.

Here, the above-mentioned second lens driving (S120) is made to be performed only once. That is, such a processing operation that the flow returns to the initial state and starts focus detection again, as in the conventional camera, is not performed. The reason for this is that, since the two images do not perfectly coincide with each other after the photographic lens 3 has been driven by the second lens driving with the phase-difference correction performed, there is a high possibility that a result of focus detection as performed again contains some errors and is, therefore, unreliable.

According to the fourth embodiment described above, in a case where the object image formed on the focus detecting sensor is regarded as a thin-line chart having a width close to the pixel pitch, the first lens driving whose target position is such a position as to make zero or nearly zero a phase difference of two images obtained without performing the phase-difference correcting processing required due to the manufacturing error of the focus detecting sensor (i.e., a position where the thin-line bar is located on the same portion of the two images) is first performed. After the completion of the first lens driving, the second lens driving whose target position is the original in-focus position obtained by performing the phase-difference correcting processing required in the focus detecting device 2 is performed. Accordingly, it is possible to avoid a defocus state even if the object image is a thin-line one having a width close to the pixel pitch of the line sensor, and it is possible to perform accurate focus adjustment.

(Fifth Embodiment)

In the fourth embodiment described above, when the first lens driving is performed, if the accuracy of stopping the photographic lens 3 is low, in some cases, the driving of the photographic lens 3 is unable to be settled within the in-focus width B, so that the first lens driving (step S116 in FIG. 11) may be repeated many times. In order to make it possible to cope with such a case, it is desirable that a limit is provided to the number of times of the first lens driving and, if the limit number is reached, the first lens driving is forcibly made to shift to the second lens driving. In this instance, since the second lens driving is started without the first lens driving being completed within the in-focus width B, the focus detecting accuracy as finally obtained may be lowered. However, it is possible to solve at least such a problem that "an in-focus state can not be obtained for a long, long time".

To realize the above arrangement, a fifth embodiment of the invention has been developed, which will be described with reference to the flow charts of FIGS. 14 and 15. The electrical construction in the fifth embodiment is the same as that shown in FIG. 9, which is also used as it is in the fifth embodiment.

Figure 14:
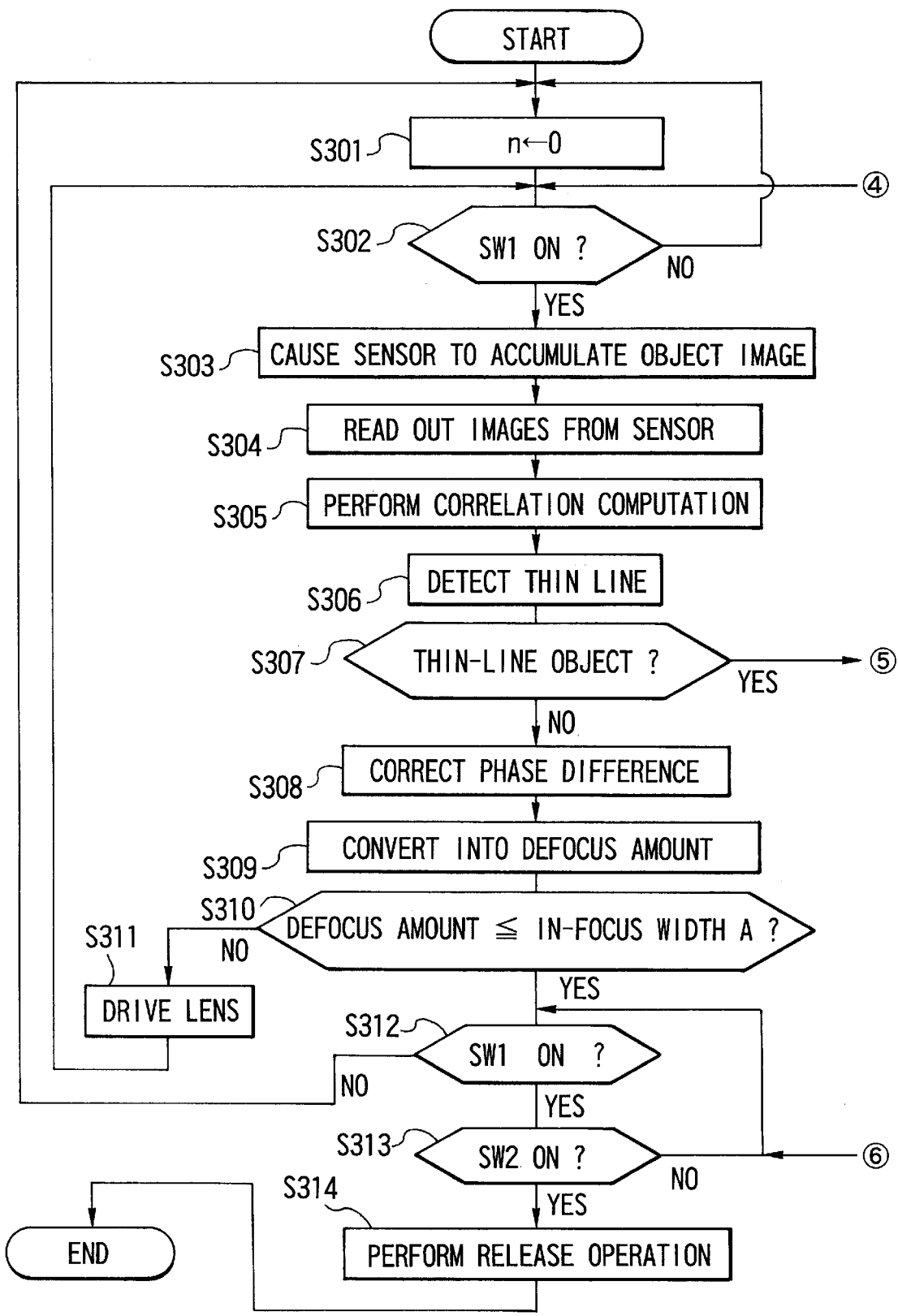
FIG. 14 is a flow chart showing a part of a series of operations in the fifth embodiment of the invention.

Referring to FIG. 14, first, a number-of-times-of-driving counter n for counting the number of times of the first lens driving is cleared (S301). Next, a check is made to find if the switch SW1 is turned on (S302). If the switch SW1 is found to be turned off, the flow returns to an initial state. If the switch SW1 is found to be turned on, an automatic focusing operation beginning with step S303 is started.

Concretely, an object image, which is a target for focus detection, is accumulated by the focus detecting device 2 (S303). Then, the accumulated object image is read out (S304). Next, a correlation computation on data of two images which are paired is performed (S305). Subsequently, it is judged whether the object image is a thin line (S306). Then, a check is made to find if the object image has been judged to be a thin line (S307). If not, the same processing as in the conventional camera is performed. More specifically, a phase-difference correction is performed (S308). The thus-obtained corrected phase difference is converted into an amount of defocus (defocus amount) on the film surface (S309). Then, a check is made to find if the defocus amount is within an in-focus width A (S310). If the defocus amount is not found to be within the in-focus width A (i.e., if an in-focus state is not considered to be obtained), the photographic lens 3 is driven as much as the defocus amount A (S311). Then, the flow returns to the checking of the switch SW1 (S302). On the other hand, if the defocus amount is found in the step S310 to be within the in-focus width A, a check is made for the states of the switches SW1 and SW2 (S312 and S313). If both the switches SW1 and SW2 are turned on, a release operation is performed (S314), and the sequence of the camera comes to an end.

Figure 15:
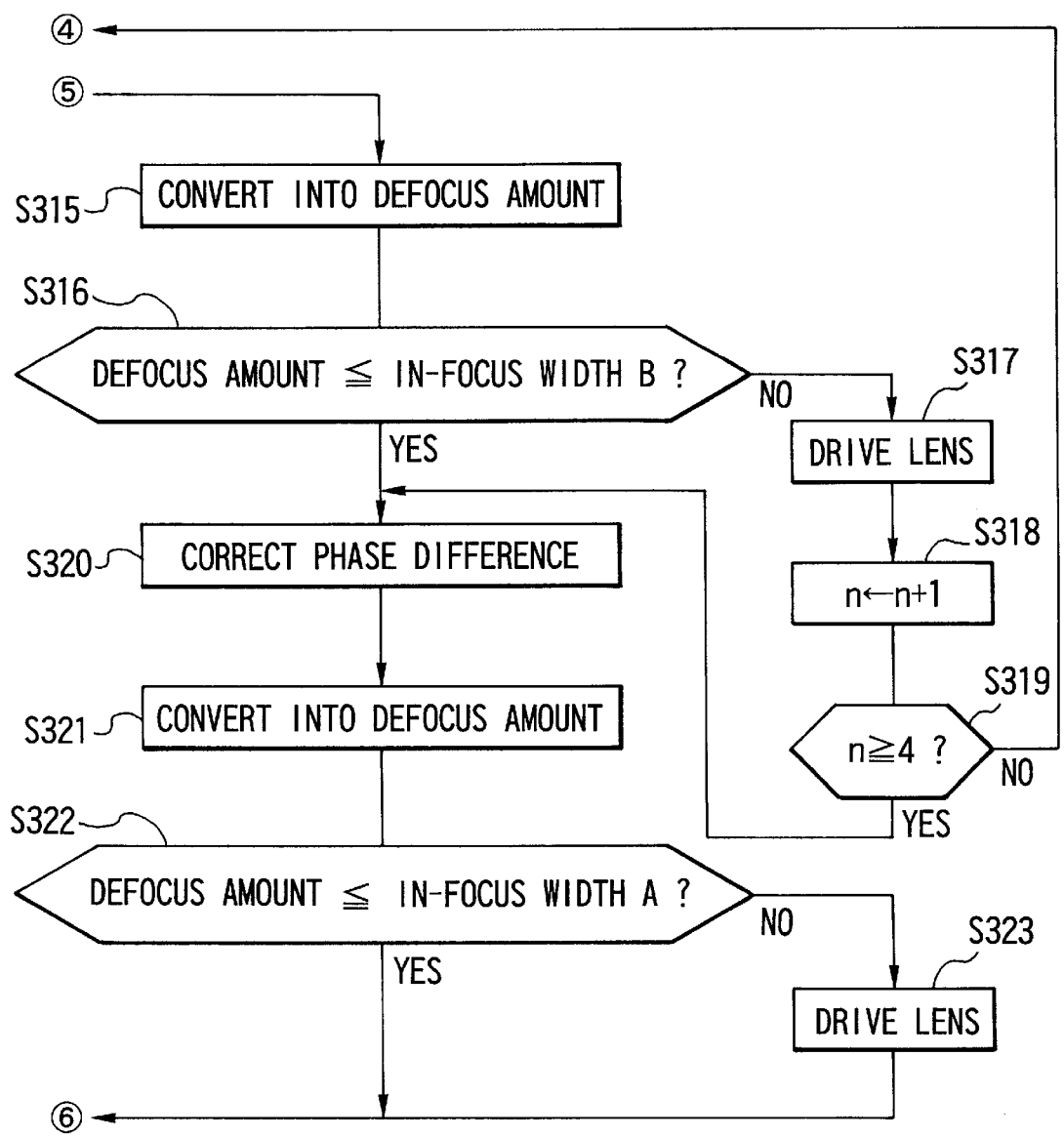
FIG. 15 is a flow chart showing the operation continuing from the operation shown in FIG. 14.

On the other hand, if the object image has been judged in the above step S307 to be a thin line, the so-called thin-line processing shown in FIG. 15 is performed. First, in order to perform "first lens driving" whose target position is such a position as to make zero or nearly zero a phase difference obtained without performing the phase-difference correcting processing (i.e., a position where two images completely coincide with each other), the value obtained without performing the phase-difference correcting processing is converted into a defocus amount (S315). Then, a check is made to find if the defocus amount is within an in-focus width B for thin-line judgment (S316). If the defocus amount is not found to be within the in-focus width B (i.e., if the two images are not considered to perfectly coincide with each other), the photographic lens 3 is driven as much as the defocus amount B (S317). Here, the number-of-times-of-driving counter n for the first lens driving is incremented (S318). Then, a check is made to find if a count result obtained by the number-of-times-of-driving counter n has reached a limit number of times (four times in the present embodiment)(S319). If not, the flow returns to the checking of the switch SW1 (S302).

If the count result is found to have reached the limit number of times, the first lens driving is forcibly made to shift to the second lens driving. That is, a phase-difference correction is performed on the phase difference obtained in the step S305, as in the conventional camera (S320). The thus-obtained corrected phase difference is converted into a defocus amount (S321). Then, a check is made to find if the defocus amount obtained in the step S321 is within the in-focus width A (S322). If the defocus amount is already within the in-focus width A, it is considered that the AF processing operation has ended, and the flow jumps to step S312 in FIG. 14, where a check is made for the states of the switches SW1 and SW2 (S312 and S313). If both the switches SW1 and SW2 are turned on, a release operation is performed (S314), and the sequence of the camera comes to an end.

On the other hand, if the defocus amount is found in the step S322 to be not within the in-focus width A, the photographic lens 3 is driven as much as the defocus amount (S323), and the flow also jumps to step S312 in FIG. 14 to perform the same processing as that described above. Then, the sequence of the camera comes to an end.

(Sixth Embodiment)

In some automatic focusing cameras, there are provided the so-called one-shot mode in which, once an in-focus state is obtained after turning-on of the switch SW1, the lens driving is no longer performed, and the so-called servo mode (also called the continuous mode) in which the lens driving continues following an object irrespective of the attainment of an in-focus state. With regard to the servo mode, which is a mode designed to follow a fast-moving object, it is, therefore, desirable to drive the lens to an in-focus position as fast as possible for every focus detection. Accordingly, in many cases, the servo mode provides no time for performing the first lens driving and then performing the second lens driving, as mentioned in the fourth and fifth embodiments, even if the object image is a thin line.

Therefore, it is necessary to compose such an algorithm as not to perform the thin-line driving (=the first lens driving +the second lens driving) during the servo mode. To realize such an arrangement, a sixth embodiment of the invention has been developed, which will be described with reference to the flow charts of FIGS. 16 and 17. The electrical construction of the camera in the sixth embodiment is the same as that shown in FIG. 9, which is also used as it is in the sixth embodiment. Incidentally, switching of the one-shot mode and the servo mode is performed by operating the switch AFSW (12) shown in FIG. 9.

Figure 16:
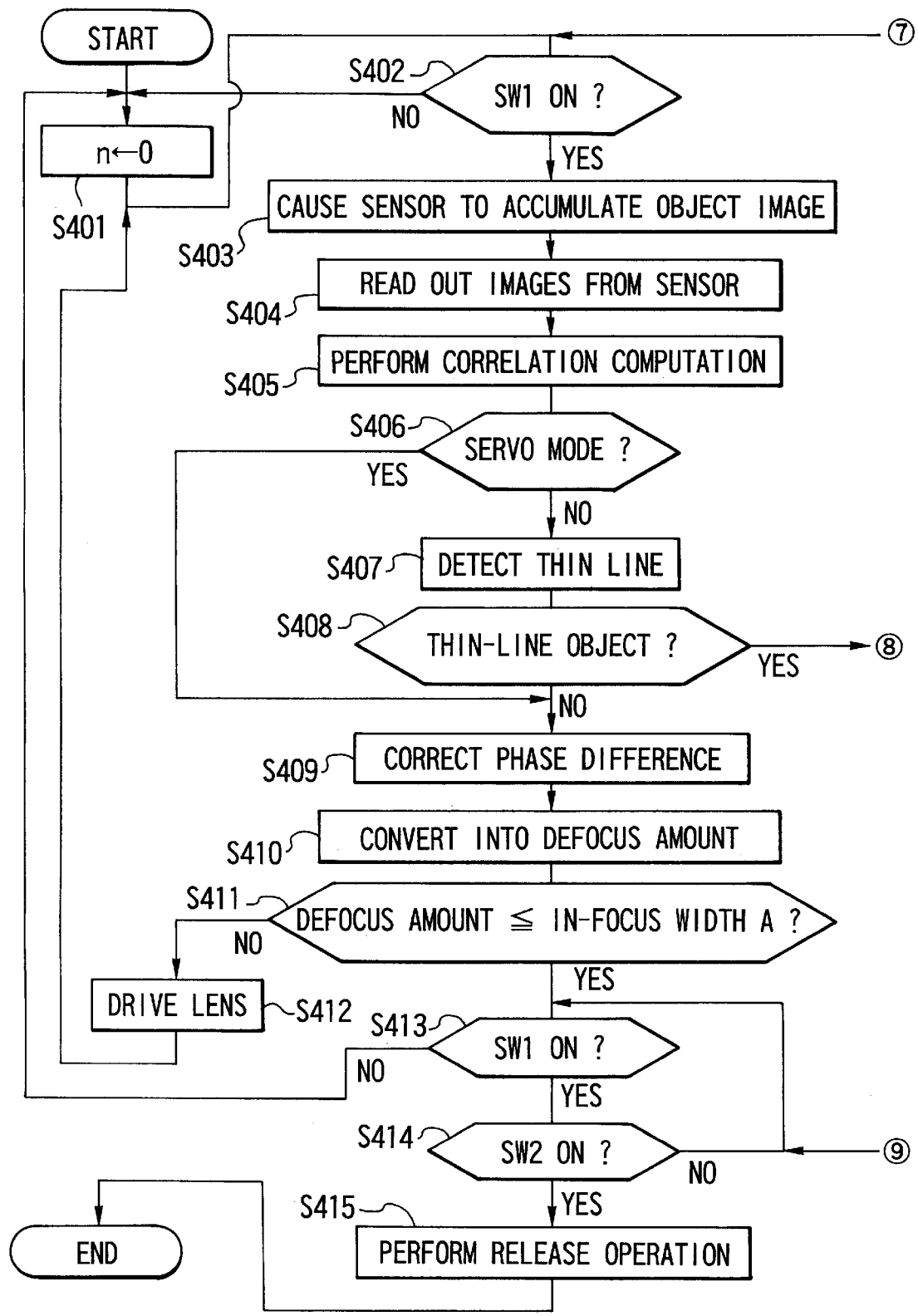
FIG. 16 is a flow chart showing a part of a series of operations in the sixth embodiment of the invention.
Figure 17:
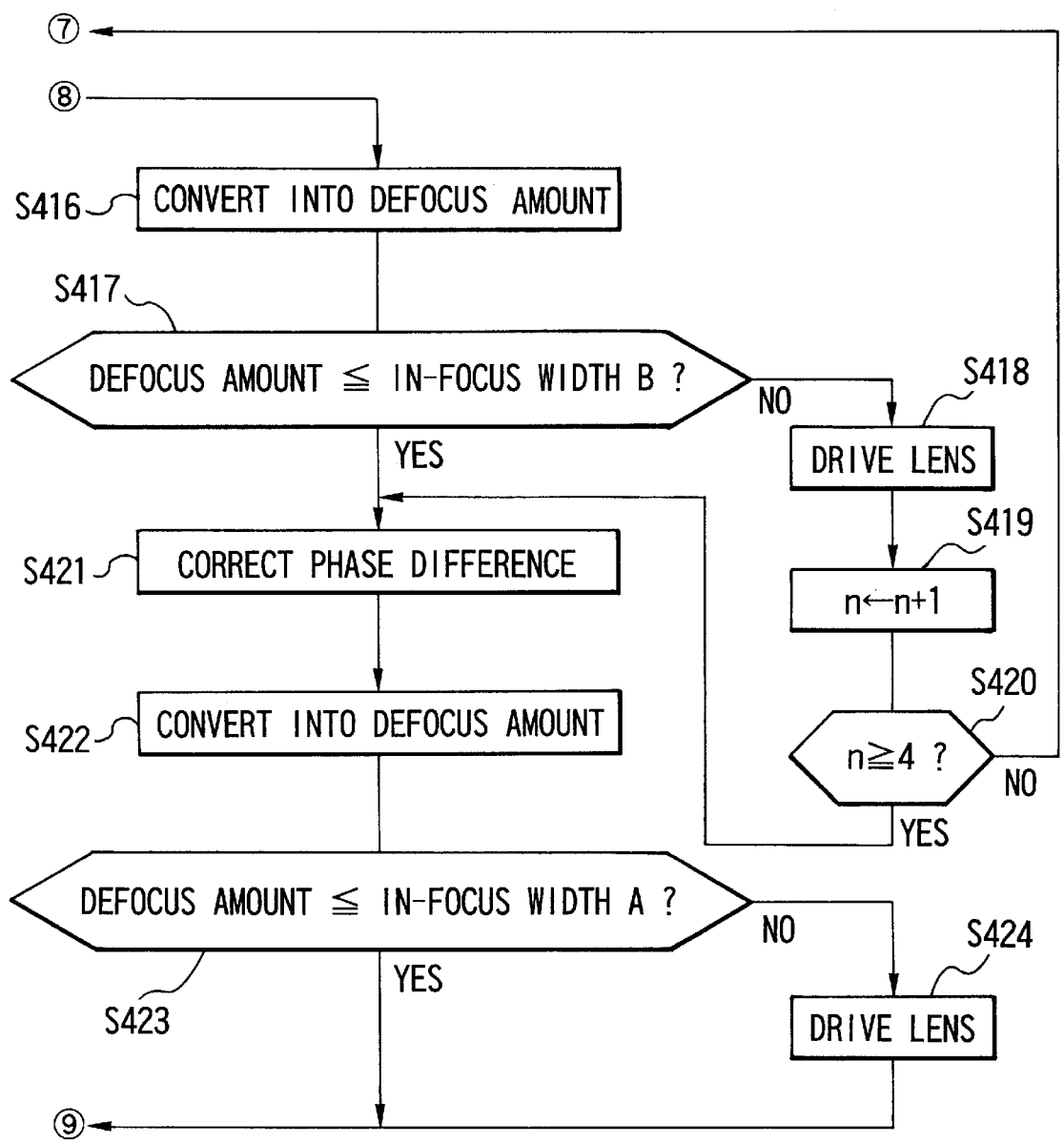
FIG. 17 is a flow chart showing the operation continuing from the operation shown in FIG. 16.
Figure 18:
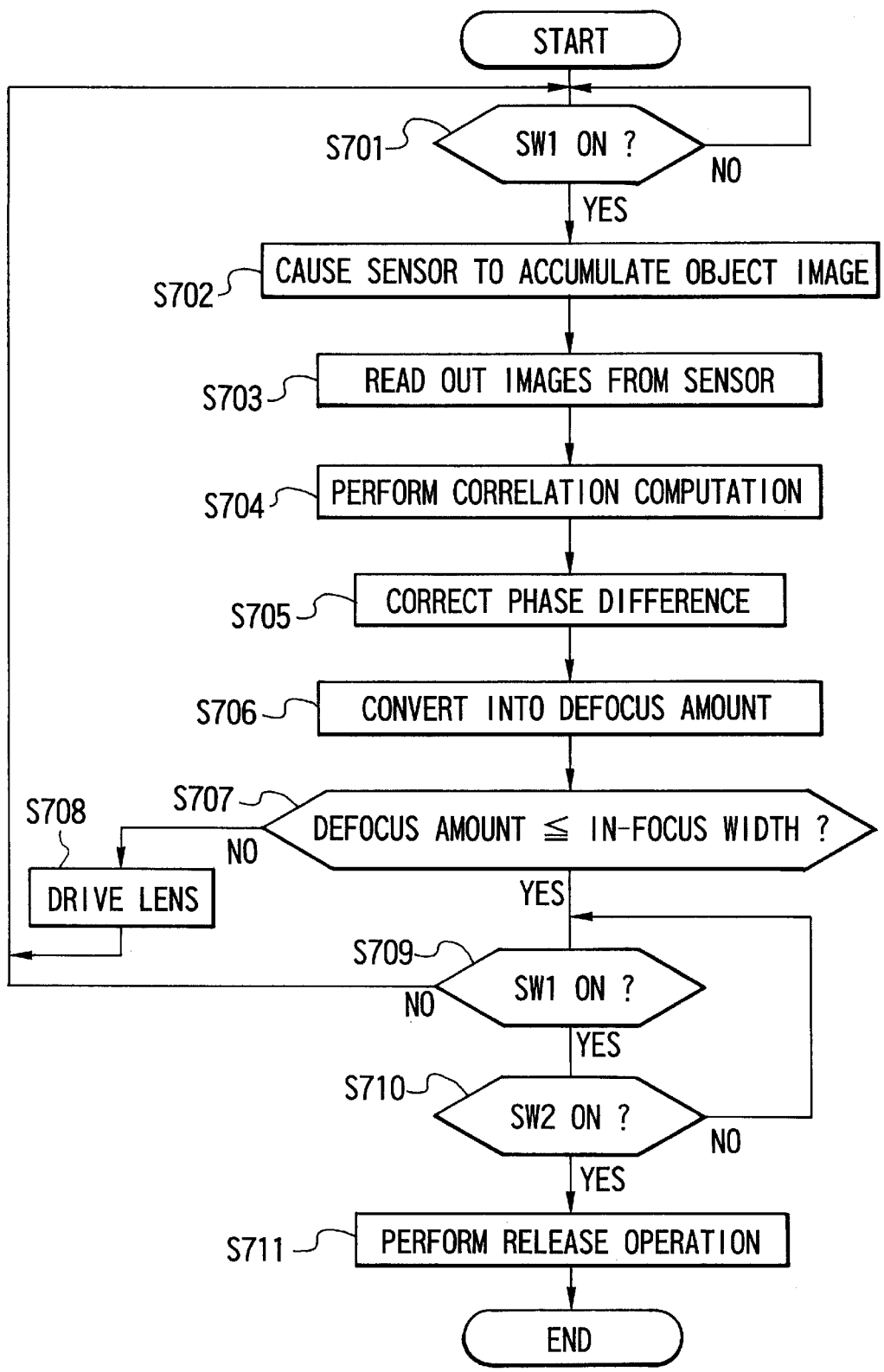
FIG. 18 is a flow chart showing a series of operations of a conventional camera.
Figure 19:
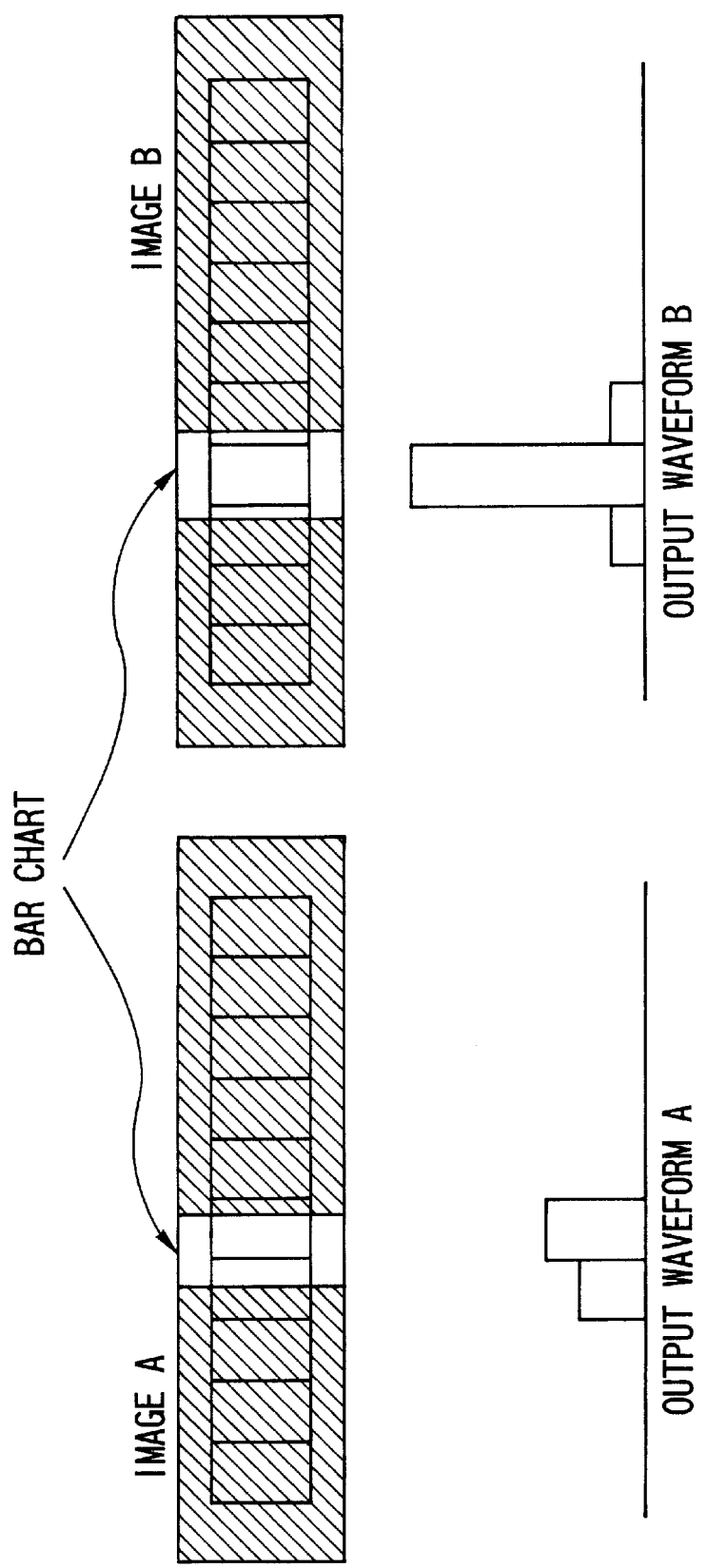
FIG. 19 is a diagram for explaining the states of sensors in the case of a thin-line chart.

Referring to FIG. 16, the processing from the initial state to the correlation computation (S401 to S405) is the same as the processing from the step S301 to the step S305 in the fifth embodiment, and is, therefore, omitted from the description. After, in the next step S405, the correlation computation is performed, a check is made for the switch AFSW (12) to find if the automatic focusing mode of the camera is the servo mode (S406). If a result of this checking indicates the servo mode, the flow immediately jumps to the processing for the phase-difference correction (S409) while skipping the processing for the thin-line detection (S407) and the checking of a result thereof (S408). That is, "the ordinary processing to be performed when regarding the object image as no thin line" is performed irrespective of whether the object image is a thin line, so that the lens driving to an in-focus position is performed from the first.

The processing from the step S409 to the release operation (S409 to S415) is the same as the processing from the step S308 to the step S314 in the fifth embodiment, and is, therefore, omitted from the description.

Further, if the automatic focusing mode of the camera is found in the step S406 to be not the servo mode, processing for the thin-line detection (S407) and the checking of a result thereof (S408) is performed in the same manner as that in the fifth embodiment. Then, the processing subsequent to the step S416 shown in FIG. 17, i.e., the processing for the thin-line driving (S416 to S424), is performed. This is the same as the processing from the step S315 to the step S323 in the fifth embodiment, and is, therefore, omitted from the description.

Further, while the above-described sixth embodiment has such an arrangement that the thin-line detection and the thin-line driving are not performed during the servo mode, in addition to that, in cases where the number of times of the lens driving for reaching an in-focus position is desired to be reduced as much as possible, for example, (i) a case where AF auxiliary light is projected by means of the AF auxiliary light device 8' (see FIG. 9) which has a limit for the number of times of light projection for every focus detection, or (ii) a case where the object is a moving body, it is of course necessary to compose such an algorithm as to cancel the thin-line detection and the thin-line driving as in the sixth embodiment.

Concretely, in the former case (i), the content of the step S406 shown in FIG. 16 is replaced with "AF auxiliary light device 8' to be used?". Then, if AF auxiliary light is not to be used, the flow proceeds to step S407, and, if AF auxiliary light is to be used, the flow immediately proceeds to step S409. Further, in the latter case (ii), a step for "detect moving object" is inserted between the step S405 and S406 shown in FIG. 16, and the content of the next step S406 is replaced with "moving object detected?". Then, if the target for focus detection is not a moving object, the flow proceeds to step S407, and, if the target for focus detection is a moving object, the flow immediately proceeds to step S409.

According to the above-described fourth to sixth embodiments, the following advantageous effects can be produced.

In the conventional camera, in a case where the object image is the so-called thin-line chart having such a thin width that is close to a pixel pitch of the focus detecting line sensor, output waveforms of the line sensors are greatly varied depending on the portions at which thin lines are formed on the line sensors, so that, as a result, a defocus state is brought about.

Therefore, in each of the fourth to sixth embodiments, it is taken into consideration that, if thin lines (two images) are formed on the same portions of the paired line sensors, the respective outputs of the line sensors are the same and a result of correlation computation thereof is reliable. Then, in a case where the object image formed on the focus detecting line sensor is regarded as the thin-line chart, the first lens driving whose target position is such a position as to make zero or nearly zero a phase difference of two images obtained without performing the phase-difference correcting processing in controlling the focus detecting line sensor (i.e., a position where the thin-line bar is located on the same portion of the two images) is first performed. After the completion of the first lens driving, the second lens driving whose target position is the original in-focus position obtained by performing the phase-difference correcting processing required in the focus detecting line sensor is performed. Accordingly, it becomes possible to cancel errors caused by the thin lines, and, therefore, it becomes possible to avoid a defocus state.

Further, as in the fifth embodiment, a limit is applied to the number of times of the first lens driving, so that it is possible to avoid such an inconvenience that an in-focus state can not be obtained for a long, long time.

Further, during the servo mode as in the sixth embodiment, or when the object is a moving body, in a case where there is no time to spare for both the first lens driving and the second lens driving, only the ordinary, second lens driving is performed, so that it is possible to proceed with the focus adjusting action without giving an unpleasant feeling to the photographer.

Further, in each of the fourth to sixth embodiments, while the phase-difference deviation in manufacturing focus detecting line sensors is put in question, the temperature of the usage environment of a camera also causes an additional phase-difference deviation. However, even if the additional phase-difference deviation is caused by the temperature, it is of course possible to absorb any phase-difference deviation by performing the first lens driving as described above.

While, in each of the embodiments described above, the invention is applied to a camera, the invention can be also applied, without limiting to the camera, to any automatic focus adjusting device having a focus detecting means of the passive type using the phase-difference detection and a means for performing the focus adjusting action of a focus adjusting lens.

What is claimed is:

1. A focus detecting or distance detecting device for etecting a focusing state or a distance by detecting a phase difference of images received by and formed on a sensor having a first light receiving part composed of a plurality of pixels and a second light receiving part composed of a plurality of pixels, said focus detecting or distance detecting device comprising:

a computing circuit which computes a phase-difference relation of the images on the first light receiving part and the second light receiving part; and a judgment circuit which judges whether the image received by and formed on the first light receiving part is a thin line close to a pixel pitch.

2. A focus detecting or distance detecting device according to claim 1, wherein said judgment circuit judges whether the image received by and formed on the first light receiving part is the thin line, on the basis of an output difference of adjacent pixels among the plurality of pixels.

3. A focus detecting or distance detecting device according to claim 1, wherein said judgment circuit judges whether the image received by and formed on the first light receiving part is the thin line, on the basis of a degree of coincidence of the images formed on the first light receiving part and the second light receiving part.

4. A focus detecting or distance detecting device according to claim 1, wherein said judgment circuit judges whether the image received by and formed on the first light receiving part is the thin line, on the basis of an output difference of adjacent pixels among the plurality of pixels and a degree of coincidence of the images formed on the first light receiving part and the second light receiving part.

5. A focus detecting or distance detecting device according to claim 3, wherein said computing circuit performs correlation computation on the images formed on the first light receiving part and the second light receiving part, and said judgment circuit judges whether the image received by and formed on the first light receiving part is the thin line, on the basis of an inclination of a correlation varying amount obtained in performing the correlation computation in units of pixel.

6. A focus detecting or distance detecting device according to claim 1, wherein said judgment circuit judges whether the image is an image having a sharp edge.

7. A focus detecting or distance detecting device according to claim 6, wherein said judgment circuit judges whether the image is an image in which portions other than a portion having the sharp edge are flat.

8. A focus detecting or distance detecting device according to claim 1, wherein said judgment circuit judges whether a value corresponding to an output difference of adjacent pixels among the plurality of pixels is larger than a predetermined value.

9. A focus detecting or distance detecting device according to claim 8, wherein said judgment circuit judges whether the image received by and formed on the first light receiving part is the thin line, on the basis of an addition value obtained by adding together output differences of adjacent pixels a value corresponding to each of which is larger than the predetermined value.

10. A focus detecting or distance detecting device according to claim 9, wherein said judgment circuit judges whether the image received by and formed on the first light receiving part is the thin line, on the basis of a difference between (i) an addition value obtained by adding together output differences of adjacent pixels a value corresponding to each of which is larger than the predetermined value and (ii) an addition value obtained by adding together output differences of adjacent pixels a value corresponding to each of which is not larger than the predetermined value.

11. A focus detecting or distance detecting device according to claim 1, further comprising a changing circuit for changing, in accordance with a result of judgment performed last by said judgment circuit, a standard for judgment to be performed next time by said judgment circuit.

12. A focus adjusting apparatus having a focus detecting or distance detecting device for detecting a focusing state or a distance by detecting a phase difference of images received by and formed on a sensor having a first light receiving part composed of a plurality of pixels and a second light receiving part composed of a plurality of pixels, said focus adjusting apparatus comprising:
a judgment circuit which judges whether the image received by and formed on the first or second light receiving part is a thin line close to a pixel pitch; and
a control circuit which causes a processing operation of said focus adjusting apparatus to be performed in a first processing mode when the image received by and formed on the first or second light receiving part is judged by said judgment circuit to be the thin line, and causes the processing operation of said focus adjusting apparatus to be performed in a second processing mode when the image received by and formed on the first or second light receiving part is judged by said judgment circuit not to be the thin line.

13. A focus adjusting apparatus according to claim 12, wherein said sensor is composed of an image-signal accumulating type sensor, and, during the first processing mode, said focus adjusting apparatus interrupts halfway a computing processing operation for the focusing state or the distance and causes said sensor to perform again an image-signal accumulating operation.

14. A focus adjusting apparatus according to claim 12, further comprising an inhibiting circuit which inhibits the first processing mode when said focus adjusting apparatus is set in a servo mode.

15. A focus detecting device for performing focus detection of passive type using phase-difference detection, comprising:
a sensor composed of a plurality of pixels which are paired; and
judgment means for judging whether a target image for focus detection is a thin line close to a pixel pitch of said sensor, on the basis of a correlation varying amount of two images formed divisionally on said sensor and an output difference of adjacent pixels of each of the two images.

16. A focus detecting device according to claim 15, further comprising means for applying hysteresis to a condition for judging whether the target image for focus detection is the thin line, on the basis of a result of judgment last performed by said judgment means.

17. A focus detecting device according to claim 15, further comprising warning means for giving warning to a user when said judgment means judges the target image for focus detection to be the thin line.

18. An automatic focusing camera comprising:
means for obtaining information for focusing by causing two images to be received by and formed on a first sensor part having a plurality of pixels disposed adjacently to one another and a second sensor part having a plurality of pixels disposed adjacently to one another, respectively, and performing a correlation computing operation on the two images; and
evaluation means for evaluating whether the image is an image suited for the correlation computing operation, on the basis of a difference between (i) an addition value obtained by adding together values corresponding respectively to output differences of adjacent pixels of the first sensor part each of which is larger than a predetermined value and (ii) an addition value obtained by adding together values corresponding respectively to output differences of adjacent pixels of the first sensor part each of which is not larger than the predetermined value.

19. An automatic focusing camera according to claim 18, wherein said evaluation means evaluates the image not to be suited for the correlation computing operation, when judging that a value corresponding to a subtraction value obtained by subtracting (i) a value corresponding to the addition value obtained by adding together values corresponding respectively to output differences of adjacent pixels of the first sensor part each of which is not larger than the predetermined value from (ii) a value corresponding to the addition value obtained by adding together values corresponding respectively to output differences of adjacent pixels of the first sensor part each of which is larger than the predetermined value is larger than a second predetermined value.

20. An automatic focusing camera comprising:

means for obtaining information for focusing by causing two images to be received by and formed on a first sensor part having a plurality of pixels disposed adjacently to one another and a second sensor part having a plurality of pixels disposed adjacently to one another, respectively, and performing a correlation computing operation on the two images; and means for obtaining (a) a subtraction value obtained by subtracting (i) a value corresponding to an addition value obtained by adding together values corresponding respectively to output differences of adjacent pixels of the first sensor part each of which is not larger than the predetermined value from (ii) a value corresponding to an addition value obtained by adding together values corresponding respectively to output differences of adjacent pixels of the first sensor part each of which is larger than the predetermined value, and (b) a subtraction value obtained by subtracting (i) a value corresponding to an addition value obtained by adding together values corresponding respectively to output differences of adjacent pixels of the second sensor part each of which is not larger than the predetermined value from (ii) a value corresponding to an addition value obtained by adding together values corresponding respectively to output differences of adjacent pixels of the second sensor part each of which is larger than the predetermined value; and evaluation means for evaluating whether the image is an image suited for the correlation computing operation, on the basis of a value corresponding to the larger one of values corresponding to the two subtraction values.

21. An automatic focusing camera according to claim 20, wherein said evaluation means evaluates the image not to be suited for the correlation computing operation, when judging that a value corresponding to the larger one of values corresponding to the two subtraction values is larger than a second predetermined value.

22. An automatic focusing camera according to claim 18, further comprising judgment means for judging the image to be suited for the correlation computing operation, irrespective of a result of evaluation made by said evaluation means, when a correlation varying amount of the two images obtained when the image formed on the first sensor part and the image formed on the second sensor part are shifted in units of pixel is larger than a second predetermined value.

23. An automatic focus adjusting device comprising:

focus detecting means of passive type using phase-difference detection of two images received by and formed on a sensor;

thin-line judging means for judging whether a target object for focus detection divisionally formed on the sensor is a thin line; and focus adjustment control means for making a focus adjustment processing operation for a focus adjusting lens to reach an in-focus position differ between when the target image for focus detection is judged by said thin-line judging means to be the thin line and when the target image for focus detection is judged by said thin-line judging means not to be the thin line.

24. An automatic focus adjusting device according to claim 23, wherein, when the target image for focus detection is judged by said thin-line judging means to be the thin line, said focus adjustment control means performs first lens driving whose target position is such a position as to make zero or nearly zero a phase difference of target images for focus detection obtained without performing a phase-difference correcting processing required due to any phase-difference deviation occurring in manufacturing said focus detecting means, and, after completion of the first lens driving, performs second lens driving whose target position is an original in-focus position obtained by performing the phase-difference correcting processing required due to any phase-difference deviation occurring in manufacturing said focus detecting means.

25. An automatic focus adjusting device according to claim 24, wherein said focus adjustment control means discriminates whether the focus adjusting lens has reached the target position of the first lens driving, every time when performing the first lens driving once, and, if the focus adjusting lens has reached the target position of the first lens driving, finishes the first lens driving and, if the focus adjusting lens has not yet reached the target position of the first lens driving, repeats the first lens driving.

26. An automatic focus adjusting device according to claim 25, wherein said focus adjustment control means has a limit to the number of times of the first lens driving, and, when the number of times of the first lens driving has reached to the limit, finishes the first lens driving even if the focus adjusting lens has not yet reached the target position of the first lens driving.

27. An automatic focus adjusting device according to claim 24, wherein said focus adjustment control means, when finishing the second lens driving once, considers the focus adjusting lens to be in focus, even if the focus adjusting lens has not yet reached the target position of the second lens driving.

28. An automatic focus adjusting device according to claim 23, wherein, in an automatic focusing mode in which the focus adjusting lens continues being driven following the target image for focus detection irrespective of attainment of an in-focus state, said focus adjustment control means performs a focus adjustment processing operation to be performed when the target image for focus detection is judged not to be the thin line, irrespective of whether the target image for focus detection is the thin line.

29. An automatic focus adjusting device according to claim 23, further comprising moving-body determining means for determining whether the target image for focus detection is a moving body, wherein, if the target image for focus detection is determined by said moving-body determining means to be the moving body, said focus adjustment control means performs a focus adjustment processing operation to be performed when the target image for focus detection is judged not to be the thin line, irrespective of whether the target image for focus detection is the thin line.

30. An automatic focus adjusting device according to claim 23, further comprising auxiliary light means for assisting focus detection, wherein, when said auxiliary light means is used, said focus adjustment control means performs a focus adjustment processing operation to be performed when the target image for focus detection is judged not to be the thin line, irrespective of whether the target image for focus detection is the thin line.

31. An automatic focus adjusting device according to claim 24, wherein, if the target image for focus detection is judged by said thin-line judging means not to be the thin line, said focus adjustment control means performs lens driving based on a phase difference obtained by performing the phase-difference correcting processing.

32. A camera comprising:

focus detecting means for detecting a focusing state by performing correlation computation of a phase difference of two images received by and formed on sensor means; and an automatic focus adjusting device which adjusts a focus adjusting lens in accordance with the focusing state detected by said focus detecting means, wherein said automatic focus adjusting device drives the focus adjusting lens for focus adjustment on the basis of phase-difference information computed without performing, on the phase-difference obtained by the correlation computation, an error correction of a movement difference due to a factor in manufacturing said camera, and, after that, drives the focus adjusting lens for focus adjustment on the basis of information obtained by the error correction.

33. A camera according to claim 32, wherein driving of the focus adjusting lens based on the phase-difference information computed without performing the error correction is repeatedly performed until the computed phase-difference information comes into such a state as to be judged to be in focus, and driving of the focus adjusting lens based on the information obtained by the error correction is performed only a predetermined number of times.

34. A camera according to claim 33, wherein the predetermined number of times is one time.

* * * * *

UNITED STATES PATENT AND TRADEMARK OFFICE
CERTIFICATE OF CORRECTION

PATENT NO. : 6,332,061 B1
DATED : December 18, 2001
INVENTOR(S) : Hiroshi Arita

It is certified that error appears in the above-identified patent and that said Letters Patent is hereby corrected as shown below:

Column 4,
Line 32, delete "(S2)" and insert -- (S5) --.
Line 38, delete "flag flags" and insert -- flag flagS --.

Column 5,
Line 29, delete "I$^0$" and insert -- I$_0$ --.
Line 33, delete "variable S2" and insert -- variable S$_2$ --.

Column 6,
Line 20, delete "flag flags" and insert -- flag flagS --.

Column 7,
Line 4, delete "variable S2" and insert -- S$_2$ --.
Line 50, delete "flag flags" and insert -- flag flagS --.
Line 59, delete "flag flags" and insert -- flag flagS --.

Column 8,
Line 2, delete "flag flags" and insert -- flag flagS --.
Line 18, delete "flag flags" and insert -- flag flagS --.

Column 10,
Line 47, delete "Sill" and insert -- S111 --.

Column 14,
Line 47, delete "etecting" and insert -- detecting --.

Signed and Sealed this

Twenty-sixth Day of November, 2002

*Attest:*

*Attesting Officer*

JAMES E. ROGAN
*Director of the United States Patent and Trademark Office*